(12) United States Patent  (10) Patent No.: US 9,045,292 B1
Ben-David et al.  (45) Date of Patent: Jun. 2, 2015

(54) METHOD AND SYSTEM FOR AUTOMATIC-ADJUSTABLE STACKER

(71) Applicants: David Ben-David, Rehovot (IL); Yaki Stern, Shoam (IL)

(72) Inventors: David Ben-David, Rehovot (IL); Yaki Stern, Shoam (IL)

(73) Assignee: Highcon Systems LTD, Yavne (IL)

( * ) Notice: Subject to any disclaimer, the term of this patent is extended or adjusted under 35 U.S.C. 154(b) by 0 days.

(21) Appl. No.: 13/915,414

(22) Filed: Jun. 11, 2013

Related U.S. Application Data

(63) Continuation of application No. PCT/IL2013/000047, filed as application No. 13/915,414 on Jun. 11, 2013, and a continuation of application No. 13/875,726, filed on May 2, 2013, now abandoned.

(60) Provisional application No. 61/641,298, filed on May 2, 2012.

(51) Int. Cl.
*G06F 7/00* (2006.01)
*B65G 57/02* (2006.01)

(52) U.S. Cl.
CPC .................................... *B65G 57/02* (2013.01)
USPC ........... 700/218; 700/213; 700/223; 700/228; 700/230

(58) Field of Classification Search
None
See application file for complete search history.

(56) References Cited

U.S. PATENT DOCUMENTS 5,460,479 A * 10/1995 Neumann et al. .......... 414/789.5
2013/0292226 A1* 11/2013 Ben-David et al. ........ 198/345.1

* cited by examiner

*Primary Examiner* — Yolanda Cumbess
(74) *Attorney, Agent, or Firm* — Smith Risley Tempel Santos LLC; Gregory Scott Smith

(57) ABSTRACT

An automatic-adjustable stacker for controlling the movement of a media, such as cardboard, through a media handling system. The stacker includes a media receiver positioned proximate a feed of the media that receives a leading edge of the media and a controller that causes the media receiver to move from a first position for receiving the media, to a second position for depositing of the media at a desired location. The media receiver is configured to prevent the media from coming into contact with other media already located at the desired location until the media has arrived at the desired location, while creating a concave-like shape to the media while conveying it.

23 Claims, 15 Drawing Sheets

METHOD AND SYSTEM FOR AUTOMATIC-ADJUSTABLE STACKER

CROSS-REFERENCE TO RELATED APPLICATIONS

This application is being filed under 37 U.S.C. 111 as a continuation application of International Application Number PCT/IL2013/000047, which has an international filing date of May 1, 2013 and which claims priority to the following U.S. provisional application for patent: Ser. No. 61/641,298 filed on May 2, 2012, bearing the tile of "METHOD AND SYSTEM FOR ADJUSTABLE STACKER". This application claims the benefit of the priority date May 2, 2012 under 37 U.S.C. 120 as a continuation of PCT/IL2013/000047, which claims priority as previously stated. The International Application Number PCT/IL2013/000047 is co-pending at the filing of this application and includes at least one common inventor. This application is also a continuation of the United States Patent Application that was filed on May 2, 2013, assigned Ser. No. 13/875,726 and bearing the title of "METHOD AND SYSTEM FOR AUTOMATIC-ADJUSTABLE STACKER", which application is a non-provisional application of, and claims the benefit of the following United States provisional application for patent: Ser. No. 61/641,298 filed on May 2, 2012, bearing the tile of "METHOD AND SYSTEM FOR ADJUSTABLE STACKER". This application incorporates by reference in their entirety, each of the above-referenced provisional, non-provisional and international applications.

TECHNICAL FIELD

The present disclosure generally relates to the die-cut/crease industry and/or printing industry, and more particularly the disclosure relates to a system and method of stacking pre-treated cardboards.

BACKGROUND

The rapid evolution of trade around the world (globalization) has created a significant demand for packaging in order to transfer/distribute goods to different remote areas. The transport of goods may be done by: ship, airplanes, trucks, and the like. The transport of goods may be performed by: the manufacturer; different suppliers; individual persons; etc. Further, a significant demand for different brochures, flyers, etc. also takes part in trade. The different brochures/flyers may have pre-folds and/or embossing, for example. Embossing such as, but not limited to Braille writing.

Packaging has taken on a major role in the marketing of products in today's environments. The package in which the goods are packed and presented, in a store for example, may determine if the goods will be appealing to a potential buyer in the store or not. Thus the packaging appearance can have a direct effect on the sales of merchandise. The brochures, flyers, and so on may also contribute to the sales/awareness with regards to a product/service etc.

Henceforth, throughout the description, drawings and claims of the present disclosure, the terms package, paperboard box, parcel, box, carton box, cardboard box, plastic box, brochure, flyers, etc. may be used interchangeably. The present disclosure may use the term 'package' as a representative term for the above group as well as variants thereof.

In the process of constructing a package, it is well known in the art that as a preliminary requirement, a pre-treated cardboard and/or paper based material must be purchased or prepared. The paper based material may be constructed in a variety of forms and using a variety of different types of materials as well as combinations thereof. For example, the material types may include, but are not limited to: waxed paper, cartridge paper, art paper, etc. Henceforth, throughout the description, drawings and claims of the present disclosure, the terms cardboard, card-stock, display board, corrugated fiberboard, paperboards of different paper based material, folding boxboard, carton, blanks, laminated paper, plastics sheets, any of these as well as other materials, may be used interchangeably. The present disclosure may use the term 'cardboard' as a representative term for the above group as well as variants thereof.

The pre-treatment of a cardboard may include the one or more of following acts: creating folding lines along the cardboard to ease and provide accurate folding of the cardboard; piercing the cardboard in different areas; creating embossment in different areas of the cardboard; cutting the raw cardboard into predefined profiles; printing on areas of the cardboard; humidifying areas of the cardboard; stamping areas of the cardboard; any of these as well as other acts and any combination of these and other acts may also be performed. Henceforth, throughout the description, drawings and claims of the present disclosure the terms pre-folded cardboard, and pre-treated cardboard may be used interchangeably. The present disclosure may use the term 'pre-treated cardboard' as a representative term for the above group as well as variants thereof.

Some common techniques for preparing a pre-treated cardboard include the acts of placing the cardboard between dies. A few non-limiting examples of types of dies include: a cutting-die; a creasing-die; an embossing-die; a scoring-die; a counter die; a combination of different types of dies; and the like. Other examples of common techniques for preparing a pre-treated cardboard include using laser energy, at various intensities and focal strengths to create some of the above-identified pre-treatments.

SUMMARY OF THE DISCLOSURE

The present disclosure presents various embodiments of systems, devices and methods for processing of cardboard items in various types of cardboard handling systems. Although the various embodiments are presented as being applicable for cardboard handling systems, it should be appreciated that the various inventive techniques and systems may equally be applied in other settings in which media or other items are moved through a processing system and that require a mechanism or method for handling of the media to eliminate, reduce or alleviate turbulence or movement of the media that could result in causing damage to the media. In general, the various embodiments include a mechanism to receive and or hold an edge of the media, such as a cardboard item, and guide, pull, encourage or otherwise assist in movement of the media from its current location, to a desired location in a manner that eliminates or minimizes contact between the media and other media or a platform onto which the media is to be deposited. As such, the various embodiments present systems and methods for gripping the media, releasing of the media, identifying the timing of gripping and releasing the media, automatically adjusting components of the system to accommodate different media types and requirements, such as speed of movement, size of media etc.

More particularly, one embodiment includes a system or device for controlling the movement of a media through a media handling system. The controller includes a media receiver positioned proximate to an end point of a module in the media handling system and operative to receive a leading edge of the media as it passes the end point of the module. In addition, a controller configured to cause the media receiver to move from a first position for receiving the media, to a second position for depositing of the media at a desired location. The media receiver is configured to prevent the media from coming into contact with other media already located at the desired location until the media has arrived at the desired location. For instance, the media receiver, in cooperation with the module feeding the media, hold the media above the surface to receive the media until the media is dropped into position. As the media may be flexible, this cooperation may cause the media to form a concave like shape which further helps to reduce the turbulence as the media is released. The controller is further configured to cause the media receiver to release the media once it arrives at the desired location.

The media receiver may include a gripper that is in a first state for receiving the media, enters a second state for securing and moving the media to the desired location, and then enters a third state for releasing of the media at the desired location. The controller can determine the distance to move the receiver and the timing of the release based on the length of the media.

The embodiment may also include a stacker for receiving the media, and the controller can adjusts parameters of the stacker.

This and other embodiments, features and aspects of the adjustable-stacker are described further in conjunction with the figures and the detailed description following.

Unless otherwise defined, all technical and/or scientific terms used herein have the same meaning as commonly understood by one of ordinary skill in the art to which the disclosure pertains. In case there is a conflict in the definition or meaning of a term, it is intended that the definitions presented within this specification are to be controlling. In addition, the materials, methods, and examples that are presented throughout the description are illustrative only and are not necessarily intended to be limiting.

Reference in the specification to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily referring to the same embodiment or all embodiments.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof and with or without employment of an operating system. Software may be embodied on a computer readable medium such as a read/write hard disc, CDROM, Flash memory, ROM, etc. In order to execute a certain task, a software program may be loaded into or accessed by an appropriate processor as needed.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific embodiments are described in detail to illustrate the inventive concepts to a person of ordinary skill in the art, such embodiments are susceptible to various modifications and alternative forms. Accordingly, the figures and written description are not intended to limit the scope of the inventive concepts in any manner.

BRIEF DESCRIPTION OF THE DRAWINGS

Examples of embodiments of the present disclosure will be understood and appreciated more fully from the following detailed description, taken in conjunction with the drawings in which:

FIG. 1a is a simplified block diagram illustrating various examples of relevant elements or functions of an example of a cardboard-handling system; in which the present disclosure may be implemented with.

FIG. 1b is a simplified block diagram illustrating various examples of elements of yet another example of embodiment of a cardboard-handling system; in which the present disclosure may be implemented with.

DETAILED DESCRIPTION OF VARIOUS EMBODIMENTS

Turning now to the figures in which like numerals and/or labels represent like elements throughout the several views, examples of embodiments of the present disclosure are described. For convenience, only some elements of the same group may be labeled with numerals. The purpose of the drawings is to describe examples of embodiments and is not for production purpose. Therefore, features shown in the figures are for illustration purposes only and are not necessarily drawn to-scale and were chosen only for convenience and clarity of presentation.

Figure 1A:
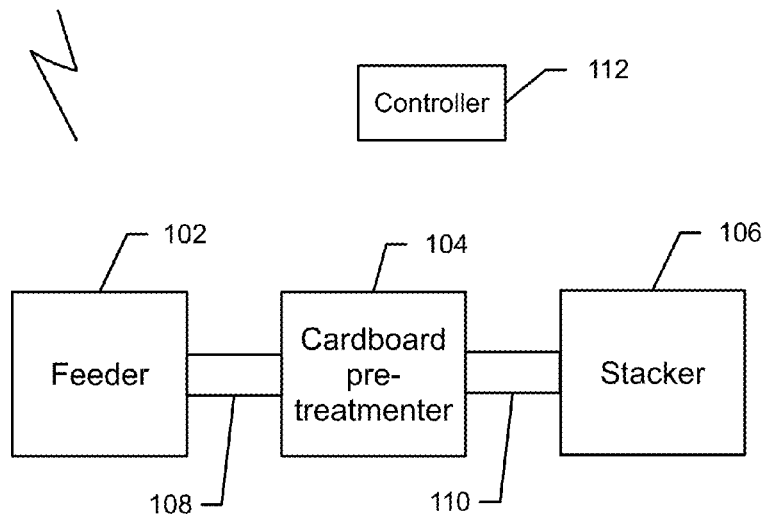

FIG. 1a is a simplified block diagram illustrating various examples of elements or functions of an example of a cardboard-handling system 100a. The illustrated embodiment of the cardboard-handling system 100a is shown as including a feeder 102, a cardboard pre-treatmenter 104, a stacker 106, a controller 112, and one or more conveyors 108 and 110. It should be appreciated that the illustrated blocks in FIG. 1a, as well as other diagrams throughout the application, the blocks or elements may be provided to show categories of functionality that may or may not be included in various embodiments of the cardboard-handling system but are not necessarily separate functional systems or devices. Further, the functional separations illustrated are not for production but rather for illustration.

The feeder 102 may get a cardboard item and feed it toward a conveyor 108. The conveyor 108 may convey the cardboard item toward the cardboard pre-treatmenter 104. The cardboard pre-treatmenter 104 may pre-treat the cardboard. The pre-treatment of the cardboard may include one or more of a variety of operations, including, but not limited to, adding creases, cuttings, embossing of areas, piercing, apertures, indentations, scoring, printing, etc. After the pretreatment, a second conveyor 110 may convey the pre-treated cardboard toward the stacker 106.

The stacker 106 may stack the pre-treated cardboard items into a pile or stack. In some embodiments, the stacker 106 may incorporate the conveyor 110 or the conveyor may be integral to the stacker 106. The controller 112 may control and/or synchronize the operation of one or more of the cardboard-handling systems 100a modules. Other examples of cardboard-handling systems 100a may comprise other modules.

Figure 1B:
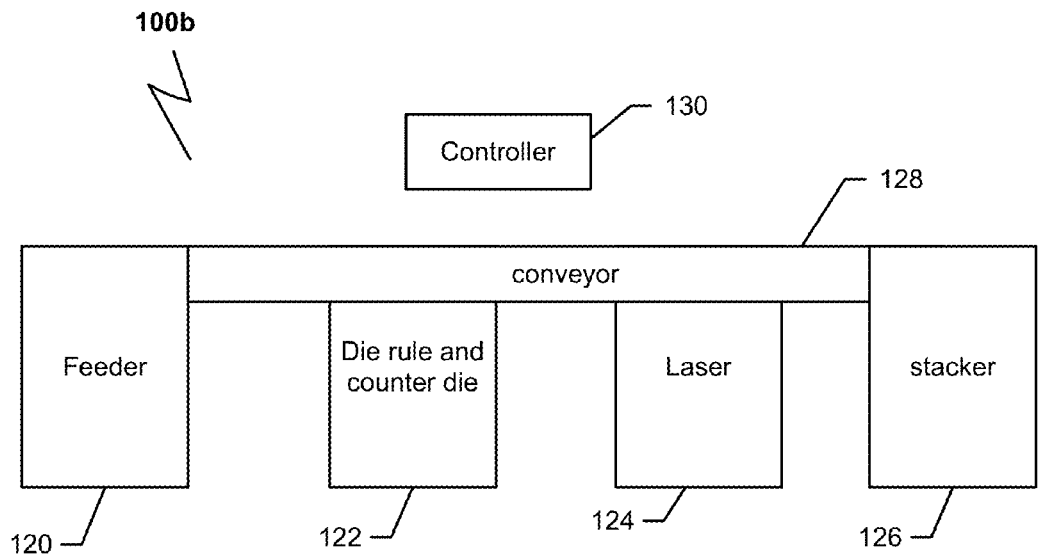

FIG. 1b is a simplified block diagram illustrating various exemplary elements of yet another example of an embodiment of a cardboard-handling system 100b. The illustrated embodiment of the cardboard-handling system 100b is shown to include a feeder 120, a die-rule and counter-die 122, a laser 124, a stacker 126, a controller 130, and a conveyor 108.

In operation, initially the feeder 120 may get a cardboard item and feeds it toward a conveyor 128. The conveyor 128 may convey the cardboard item toward and/or through the die-rule and counter-die 122. The die-rule and counter-die 122 operates to pre-treat the cardboard item. The pre-treatment of the cardboard item can include one or more of a variety of operations, including, but not limited to, adding creases, cuttings, embossing of areas, piercing, apertures, indentations, scoring, printing, etc.

Next the conveyor 128 may convey the pre-treated cardboard item toward the laser 124 to be further pre-treated, for example, by the laser cutting and/or creases the cardboard item. The conveyor 128 may then convey the pre-treated cardboard toward the stacker 126. The stacker 126 may stack the pre-treated cardboard items into a pile or stack. The controller 130 may synchronize and control one or more of the modules of the cardboard-handling system 100b.

The controller 130 may get input signals or data from different sensors along the cardboard-handling system 100, and accordingly, respond by sending commands to one or more modules. These commands may include, but are not limited to: velocity of the conveyor, start/stop operation, grab/release cardboard, forward/backward cardboard, a combination of two or more of these as well as other commands. In some embodiments, the controller may get information from an operator. Other examples of cardboard-handling systems 100a and 100b may comprise other modules, more of the same modules, only some of the described modules, and so on.

More information on embodiments of the cardboard-handling systems may be found in related US patent applications bearing the title of "Cardboard-handling system and method" having serial number U.S. Ser. No. 13/684,196 and PCT patent application bearing the title of "Cardboard-handling system and method" having serial number PCT/IL2012/000377. The above US patent applications and PCT patent applications are incorporated herein by reference in their entirety.

Other systems that may require a cardboard stacker may be, but are not limited to: coating systems (lamination coating, for instance); selective coating systems, printing systems, pre-print systems, post-print systems; finishing systems as well as combination of these and other systems.

Figure 2A:
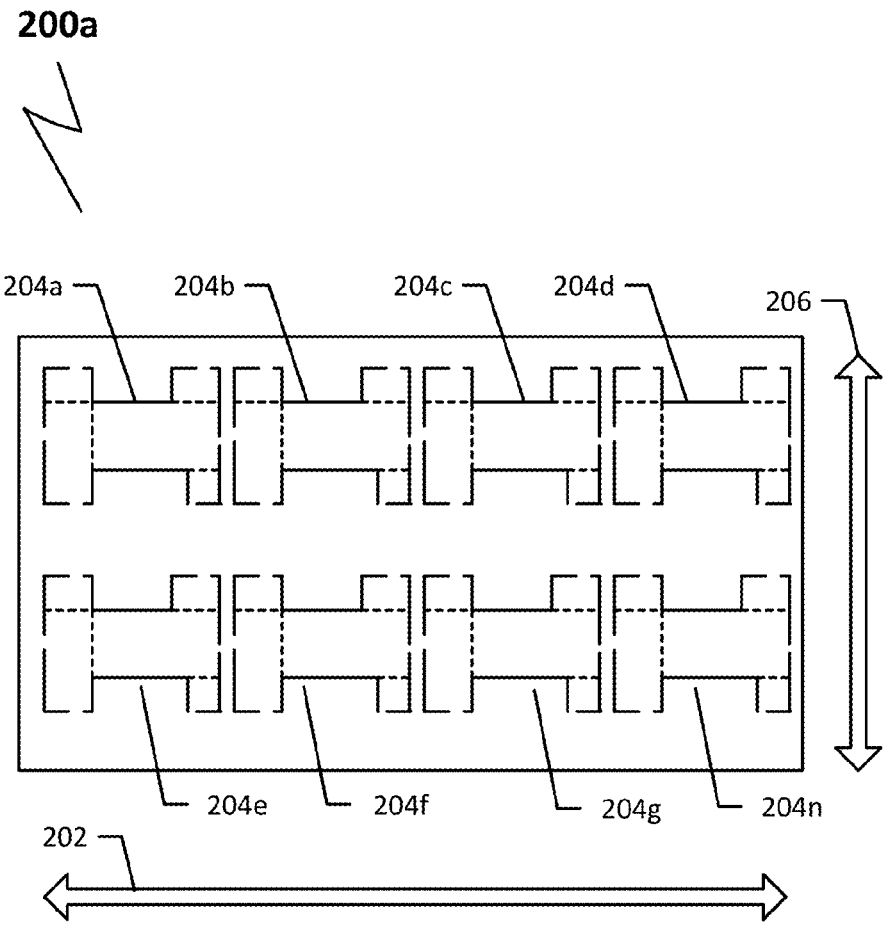
FIG. 2a schematically illustrates a simplified example with relevant elements of a design of a pretreated cardboard.

FIG. 2a schematically illustrates a simplified example of a design of a pretreated cardboard 200a. Pretreated cardboard 200a may comprise a plurality of sections 204a-n. Each section 204a-n may represent: a package layout; a printed image; a laminated area, a processed area; a combination of two or more of these as well as others. Henceforth, throughout the present description, drawings and claims, the word 'section' may be used as a representative word for the above group and the like.

Pre-treated cardboards 200a may vary in the parameters that are required for each job. For instance, in various non-limiting examples of pre-treated cardboards, the parameters may include one or more of, but are not limited to: width 206, length 202, number of sections 204a-n, type of material, thickness (not shown in drawing), etc. Furthermore the sections 204a-n themselves may vary between the different jobs and between themselves.

Figure 2B:
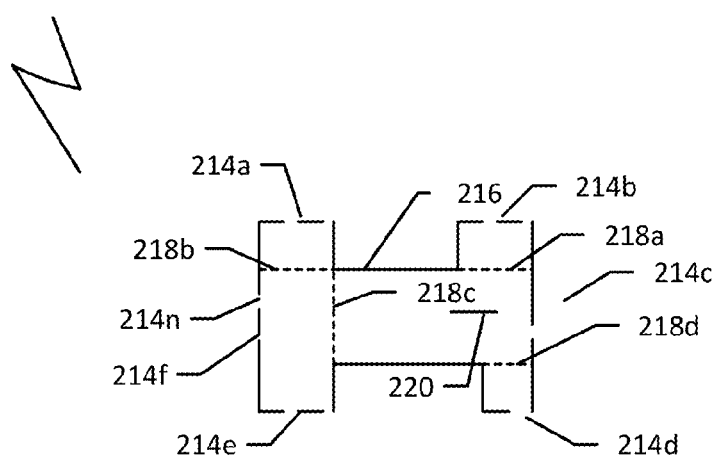
FIG. 2b schematically illustrates a simplified example with relevant elements of a section of a cardboard item.

FIG. 2b schematically illustrates a simplified example of a section of a cardboard item 200b. As a non-limiting example, a section 200b may be a package layout. The package layout 200b may comprise a plurality of creases 218a-d. The creases 218a-d may ease the folding of the cardboard at the creased locations upon assembly or use of the packaging. The package layout's 200b surrounding may be an un-continuous cut line 216 comprising a plurality of joints 214a-n (un-cut areas in rib liked shapes, for instance). The joints 214a-n may be used to keep the package layout 200b connected to a pre-treated cardboard that it is part of. Cuts may also be in the package layout, cut 220 for instance.

The sections 204a-n thus may remain connected or partially connected to the pre-treated cardboard 200a by the joints 214a-n. Furthermore, sections 204a-n and/or parts of sections 204a-n may protrude from the pre-treated cardboard 200a that they are a part of. The protruding may be as a cause of the creasing 218a-d, cuts 216, 220, dimension of the joints 214a-n, etc. Partial cutting of the surrounding of sections 204a-n (the joints 214a-n), may create a some what loose connection of sections 204a-n to the pre-treated cardboard 200a that they are a part of. The fewer number of joints 214a-n and/or the smaller the size of the joints 214a-n the looser the connection of the sections 204a-n may be to the pre-treated cardboard 200a.

Those of ordinary skill in the art will appreciate that a pre-treated cardboard item 200a, while been transferred from one place to another, will have contact with another pre-treated cardboard surface then the transferred pre-treated cardboard may be damaged. A surface may be the surface of another pretreated cardboard that is sitting on the top of a pile of cardboards, for example. The contact can be any of a variety of contacts, such as relative brushing against each other as a non-limiting example. Furthermore, the transferred pre-treated cardboard may damage a laid pre-treated cardboard on a top of a pre-treated cardboard pile. In such circumstances, there is likelihood that the transferred pre-treated cardboard may be damaged as well.

Examples of damages to the pre-treated cardboard (the transferred pre-treated cardboard and/or the cardboard that is laying on top of a pile pre-treated cardboard) may include damages such as: ripping fully or partially of one or more sections 204a-n and/or its surrounding; wrinkling fully or partially of one or more sections 204a-n and/or its surrounding, full separation of one or more sections 204a-n, jamming of transferred pre-treated cardboard, scratching of the surface of the pre-treated cardboards, smears of printed images on the surface of the pre-treated cardboards, as well as other damages.

The damage may be caused due to one or more partially connected section 204a-n and it's creases and/or cutting hat may protrude from the surface of the pre-treated cardboard 200a (section 204 of the transferred pre-treated cardboard and/or the laid on top of a file pre-treated cardboard).

Figure 2C:
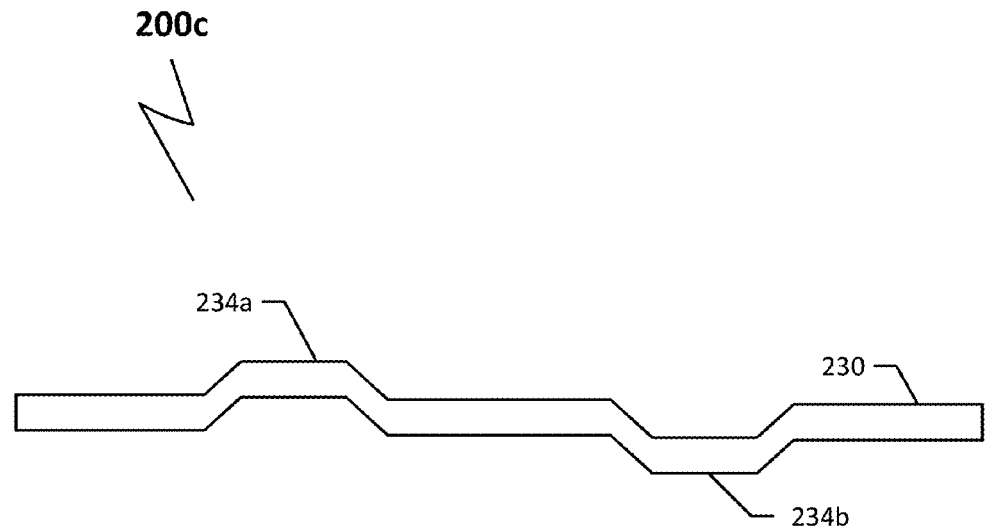
FIG. 2c schematically illustrates a simplified portion of an example of pretreated cardboard with a plurality of protruded sections.

FIG. 2c schematically illustrates a simplified portion of an exemplary embodiment of pretreated cardboard 230 with protruded section 234a and 234b, for example. The protruded section 234a may protrude upward and the protruded section 234a may protrude downward. It should be appreciated that in various pre-treated cardboard embodiments some of the sections may protruded at different angles, heights, widths, lengths and combinations thereof (not shown in drawings), etc.

Figure 2D:
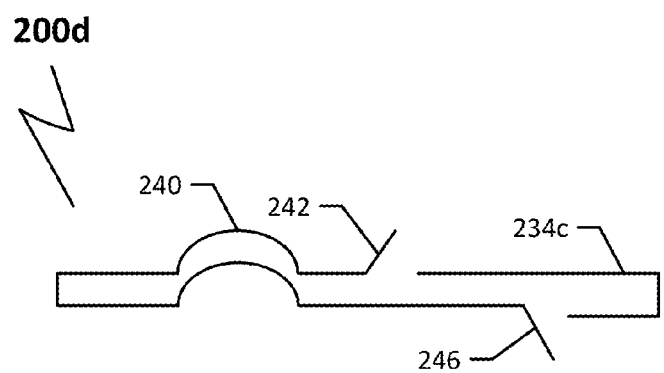
FIG. 2d schematically illustrates a simplified portion of an example of relevant elements of a section with protruded areas.

FIG. 2d schematically illustrates a simplified portion of an example of a section 234c with protruded areas 240, 242 and 246. The protruded areas may be creases 240, and/or cuts 242 and 246, for example. It should be appreciated that in various embodiments some of the sections may protruded at different angles and heights (not shown in drawings), etc.

The protruded one or more sections 234a&b and/or one or more areas 240-246 may tend to wrinkle and/or disconnect from the pre-treated cardboard they are part of, if they come into contact with another surface while the pre-treated cardboard is being transferred. Further, the protruded one or more sections 234a-c and/or one or more areas 240-246 may damage a counter pre-treated cardboard (not shown in drawing) if they would to come in contact with while being transferred, and vice versa.

Those of ordinary skill in the art will also appreciate that if a pre-treated cardboard 200a with a partially connected section 204 and/or protruded areas comes into contact with another pretreated cardboard and/or top surface of a pile while it is being transferred, and thus becomes damaged, the cardboard 200a may get jammed and thus may stop a production line, for instance. Contact that could result in such damage may include simply brushing against each other, for instance.

Further, contact between two or more pretreated cardboards 200a and/or between one pretreated cardboard 200a and a surface may cause one or more sections 204a-n of a pre-treated cardboard 200a to protrude. Furthermore the way the pre-treated cardboard is transferred may cause one or more sections 204a-n of a pre-treated cardboard 200a to protrude.

The above-described deficiencies in common die-cut/crease industries, printing industries, lamination industries, pre-printing, post printing industries, and the like, do not intend to limit the scope of the inventive concepts in any manner. They are merely presented for illustrating an existing situation.

Among other things, the present disclosure provides a novel system and method for an automatic-adjustable stacker (AA stacker) that may be implemented in cardboard-handling systems such as, but not limited to: common steel-rule die industry, surface-adhesive-rule technology (SART), laser industry, printing industries, coating systems, selective coating systems, printing systems, pre-print systems, post-print systems; finishing systems, any of these as well as other systems.

More information on surface-adhesive-rule technology (SART) may be found in the related United States non-provisional patent application bearing the title of "Method and system for surface adhesive rule technology" having been assigned Ser. No. 13/108,389. The above application is incorporated herein by reference in its entirety.

An example of an embodiment of an automatic-adjustable stacker may operate to transfer a pre-treated cardboard from a required place (end of a pretreating-cardboard system, for example) toward a pile of pre-treated cardboards while ensuring minimum contact between the transferred pre-treated cardboard and a top surface of the pile of pre-treated cardboards during the process of transferring the pretreated cardboard.

In operation, the automatic-adjustable stacker (AA stacker) may transfer the pretreated cardboard to a point that is substantially close to the location at which the pretreated cardboard needs to be laid, and then release the pretreated cardboard. Such an embodiment of an automatic-adjustable stacker may thus transfer a pre-treated cardboard while preventing the separation of its different sections.

Furthermore, in some embodiments of the automatic-adjustable stacker, one or more parameters of the automatic-adjustable stacker (AA stacker) may be automatically adjusted according to different job requirements. A few non-limiting examples of parameters of the adjustable stacker that may be automatically adjusted may include parameters regarding the cardboard, such as the length, the width, the height, the position near and/or along a cardboard-handling systems, etc.

A few non-limiting examples of job requirements for which an automatic-adjustable stacker (AA stacker) may be automatically adjusted to satisfy the requirements of may include: the pre-treated cardboard parameters as presented above (thickness, length, width, weight, etc.), the parameters regarding the sections of the pre-treated cardboard, the layout of the sections of the pre-treated cardboard, the speed, timing and placement of the pre-treated cardboard just before it reaches the AA stacker (automatic-adjustable stacker), the sorting requirements of different pre-treated cardboards, the number of piles of pre-treated cardboards, the number of pre-treated cardboards in a pile, the required minimum or maximum height of a pile of pre-treated cardboards, as well as a combination of two or more of the listed requirements as well as others.

A cardboard-handling system that pre-treats many different jobs and cardboard formats may benefit from the many advantageous that the various embodiments of an AA stacker offers. For example, an AA stacker may eliminate or at least greatly reduce the need or dependency for a human specialist. Further, an AA stacker may enable an automatic cardboard-handling system to automatically run for or span operations across several different jobs without requiring an operators to stop the machine processing so that manual adjustments can be made. As such, it will be appreciated that this allows for a continuously stacking operation.

Furthermore, as will be described in more details in conjunction with the description of the remaining figures, some embodiments of the AA stacker may further automatically sort, in real-time, different pre-treated cardboards while continuously stacking the pre-treated cardboards. The sorting may be performed according to a variety of factors. A few non-limiting factors may include the sorting being based on the different languages printed on the pre-treated cardboards, based on the different pre-treated cardboard format/layouts, collating sorting, and so on.

Figure 3A:
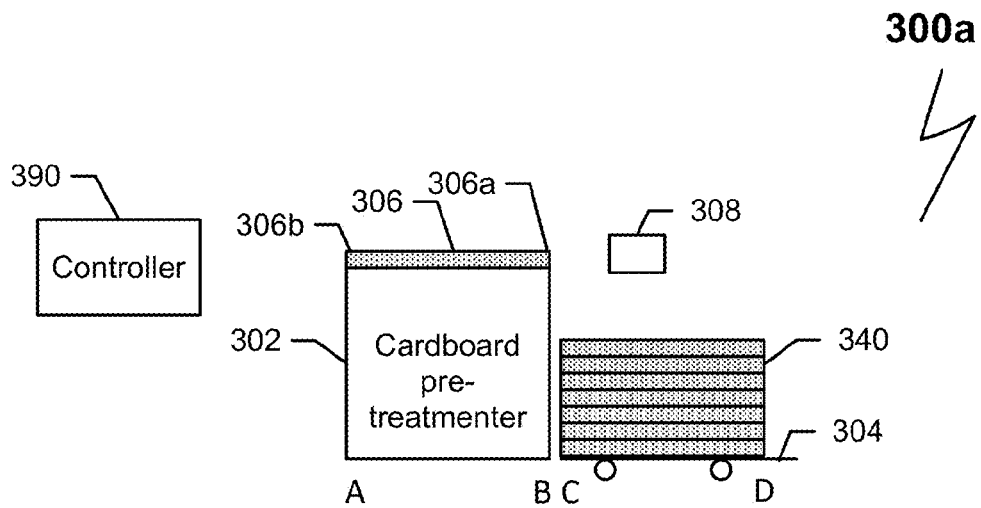
FIGS. 3a-e are schematics illustrating a conceptual portion of simplified block diagrams with relevant elements of an example of a novel system and method of an automatic-adjustable stacker (AA stacker) transferring a pre-treated cardboard; according to teaching of the present disclosure.

FIGS. 3a-h are schematics illustrating a conceptual portion of simplified block diagrams with relevant elements of an example of a novel system and method of an automatic-adjustable stacker (AA stacker) transferring a pre-treated cardboard. In FIG. 3a, a pre-treated cardboard 306 may be pretreated at a cardboard pre-treatmenter 302. An example of cardboard pre-treatmenter may include: a rule-die and counter-die, a laser, a printer, a conveyor, a combination of two or more of these as well as other options. The pretreated cardboard's leading edge is marked in the drawing as 306a and the pretreated cardboard's trailing edge is marked in the drawing as 306b.

Some embodiments of the AA stacker may comprise a collector 304. A few non-limiting examples of collectors 304 that may be suitable include: a substantially flat plane, an open-top box, a belt, any of these as well as other. In some embodiments, the collector 304 may have an automatic-adjusted structure. In other embodiments the collector 304 may have an automatic-adjusted placement. Yet in other embodiments the collector may have an automatic-adjusted structure and placement.

A few non-limiting examples of an automatic-adjusted structure of the collector 304 may include: an automatic-adjustable length; automatic-adjustable width; automatic-adjustable height; and/or a combination of two or more of them as well as other automatic-adjusted parameters. One or more exemplary embodiments of the automatic-adjusted placement of the collector 304 may include: wheels, rails, belts, inherent extenders, and so on. In other embodiments, the collector 304 may have a fixed structure. Yet in some embodiments the collector 304 may be the ground.

An automatic adjustable stacker may comprise a gripper 308. The gripper 308 may have an automatic-adjustable placement. Advantageously, the gripper 308 may be automatically adjusted to get and/or to release the pre-treated cardboard at different places according to parameters of the pre-treated cardboard and\or job requirements. Some embodiments of the gripper 308 may include one or more of the following elements: mechanical grippers, vacuum grippers, clamps, vacuum belts, suction cups, side grippers, belts, chains, electrostatics, cyclic belts, and the like. More information on examples of gripper are disclosed in conjunction with FIGS. 5, 9, 10, 11, and 12.

Advantageously, the AA stacker's automatic adjustable modules enable them to automatically-adjust themselves on the fly according to each pre-cardboard parameters and/or requirements; and/or according to the job requirements.

Some examples of an automatic adjustable stacker may further include a controller 390. The controller 390 may synchronize between different modules of the cardboard-pre-treatmenter 302 and the AA stacker's collector 304 and/or gripper 308. A controller 390 may obtain input from different sources. Sources such as, but not limited to: sensors; one or more modules of the cardboard pre-treatmenter 302; one or more modules of the automatic-adjustable stacker; an operator; one or more other modules of a cardboard-handling system that the cardboard pre-treatmenter 302 is part of; a combination of these as well as other options. A few non-limiting examples of sensors may include: optic sensors, mechanical sensors, etc.

The AA stacker may control and ensure a continuous motion of the movement of the pre-treated cardboard 306 toward a pile of pre-treated cardboards 340 while ensuring minimum contact between the transferred per-treated cardboard 306 and the pile of pre-treated cardboards 340, up and to the point that the transferred pretreated cardboard 306 is at its final required place.

In some embodiments, the controller may automatically control the position of the collector 304 in reference to the cardboard pre-treatmenter 302. In some embodiments, the controller may automatically control the width of the collector 304 in reference to the pre-treated cardboard's 306 parameters. The adjustments may be done automatically as the controller 390 obtains information on the pre-treated cardboards parameters.

In some examples the controller may automatically control the position of the gripper 308 relative to the cardboard pre-treatmenter 302 and/or pre-treated cardboard and/or collector 304 and/or pile of pre-treated cardboards 340. The controller may control the timing and/or placement that the gripper 308 obtains the cardboard and/or releases the pre-treated cardboard. The adjustments may be done automatically as the controller 390 gets information on the parameters of the pre-treated cardboards and/or placement of the collector 304 and/ or placement of a pile 340, etc.

The input on the pre-treated cardboard may be automatically measured by one or more sensors along the path of the cardboard-handling system that the cardboard pre-treatmenter 302 is part of, and/or entered by an operator, for instance. Sensors that may be used to make such automatic measurements may include, but are not limited to: optic sensors, mechanical sensors, etc. The differences from one pre-treated cardboard to another pre-treated cardboard may be measured in real time and/or from one job to another.

The collector 304 may include, in at least some embodiments, an automatic mechanical movement mechanism and/ or an automatic mechanical expansion mechanism. The automatic mechanical movement mechanism may include elements such as, but not limited to: wheels, belts, movable layers, cyclic belts, chains, etc. The automatic mechanical expansion capabilities (i.e., length wise and/or width wise) may include elements such as, but not limited to: belts, cyclic belts, movable layers, chains, etc. Yet in some embodiments the AA stacker's collector 304 may simply be a non-mobile platform or the ground.

The controller 390 may operate to control the placement of the front edge of the collector 304 (point C) in accordance to the cardboard pre-treatmenter 302. For example, the front edge of the collector 304 (point C) may be automatically placed in proximity to the final edge (point B) of the cardboard pre-treatmenter 302.

In some embodiments, the collector 304 may be automatically adjusted in a way that the distance from the collector's farthest edge (point D) from the cardboard pre-treatmenter 302 to the cardboard pre-treatmenter 302 end edge (point B) is substantially similar to the length of the pre-treated cardboard 306. As such, the automatic adjustments may include, as non-limiting examples, one or more of the following adjustments: automatically adjusting the length of the collector 304; automatically adjusting the placement of the collector 304; a combination of these adjustments as well as other adjustments. The automatic adjustment may be done before a job starts or it may be performed dynamically and/or in real-time (on the fly).

Further the width of the collector 304 may be automatically adjusted according to the width of the pre-treated cardboard 306. The automatic adjustment may be performed prior to commencement of a job or it may be performed dynamically and/or in real-time (on the fly).

The automatic adjustments of the collector 304 and/or gripper 308 may be for different variations of parameters between the pre-treated cardboards, for instance. Variances of parameters of pre-treated cardboards of the same job may be around a few mm difference (20 mm, for example) in: width; thickness; weight, fiber direction, and so on. Variances of parameters of pre-treated cardboards of different jobs may be of higher variance, such as a few cm (20 cm, for example).

Figure 3B:
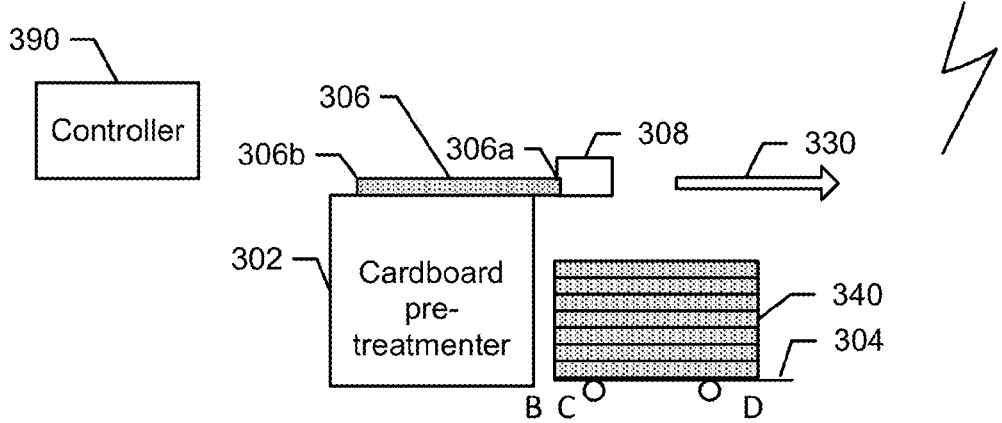

FIG. 3b illustrates the operation of the pre-treated cardboard 306 being grabbed at its leading edge 306a by the gripper 308 AA stacker which his located near the end edge (point B) of the cardboard pre-treatmenter 302. The gripper 308 may pull the pre-treated cardboard 306 toward the collector 304 in the direction shown by arrow 330, for example.

Figure 3C:
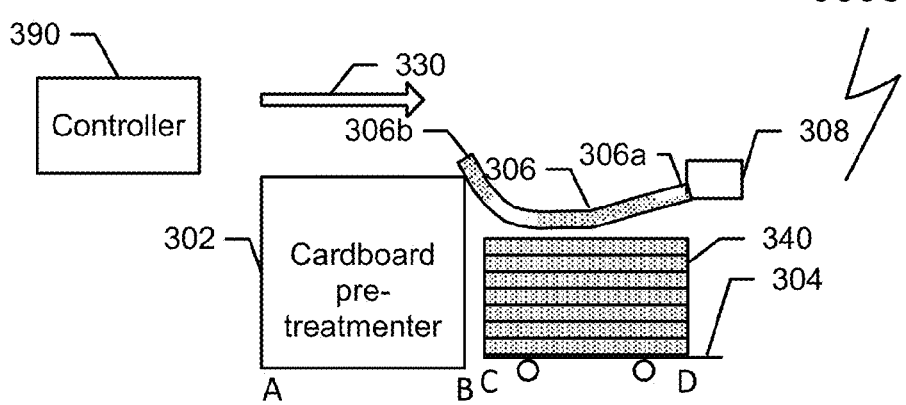

FIG. 3c illustrates the operation of the pre-treated cardboard 306 being transferred by the gripper 308 of the AA stacker in such a way that the pre-treated cardboard 306 has no contact with a pile 340 of pre-treated cardboard in the collector 304 until its trailing edge 306b reaches the end edge of the cardboard pre-treatmenter 302 (point B). When the trailing edge 306b of the pre-treated cardboard 306 reaches the end edge of the cardboard pre-treatmenter 302 (point B) the gripper 308 may release the leading edge 306a of the pre-treated cardboard 306.

Advantageously, the pre-treated cardboard 306 reaches its destination with minimum contact with the top surface of the piled pre-treated cardboards 340, while being held at its two edges, leading edge 306a held by the gripper 308 and trailing edge 306b laid on the top of the cardboard pre-treatmenter module 302 before the AA stacker 304, through substantially most of the transfer toward its destination to the pile 340. Thus, advantageously preventing or alleviating potential damages during the conveying of the pre-treated cardboard 306. Damages such as, but not limited to: friction induced damage, printed-image damages, static electricity damage; wrinkling, tearing, jamming, separations, a combination of two or more of the above as well as other damages.

The pre-treated cardboard 306 may have a concavity-like shape while being transferred. Advantageously, this may create a controlled landing of the pre-treated cardboard 306 over the surface of the collector 304 or the surface of a pile 340 of pre-treated cardboards laid on the collector 304.

Figure 3D:
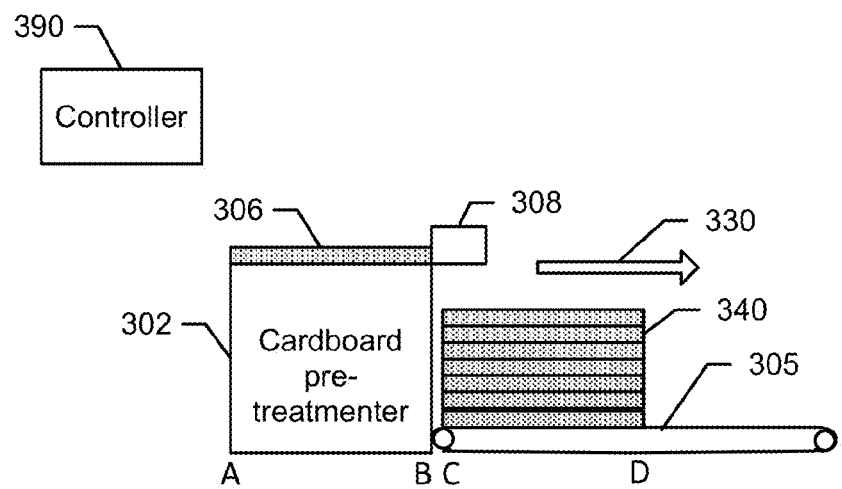

FIG. 3d schematically illustrates a simplified portion of a block diagram with relevant elements of an example of embodiment of an automatic-adjustable stacker 300d. AA stacker 300d may be similar to the AA stacker illustrated in FIG. 3a-c. AA stacker 300d schematically illustrates an example of an embodiment of a cyclic belt collector 305. In this embodiment, the location of the pile of cardboards, as well as the relative position of the pile with regards to the cardboard pre-treatmenter 302 can be easily adjusted.

Figure 3E:
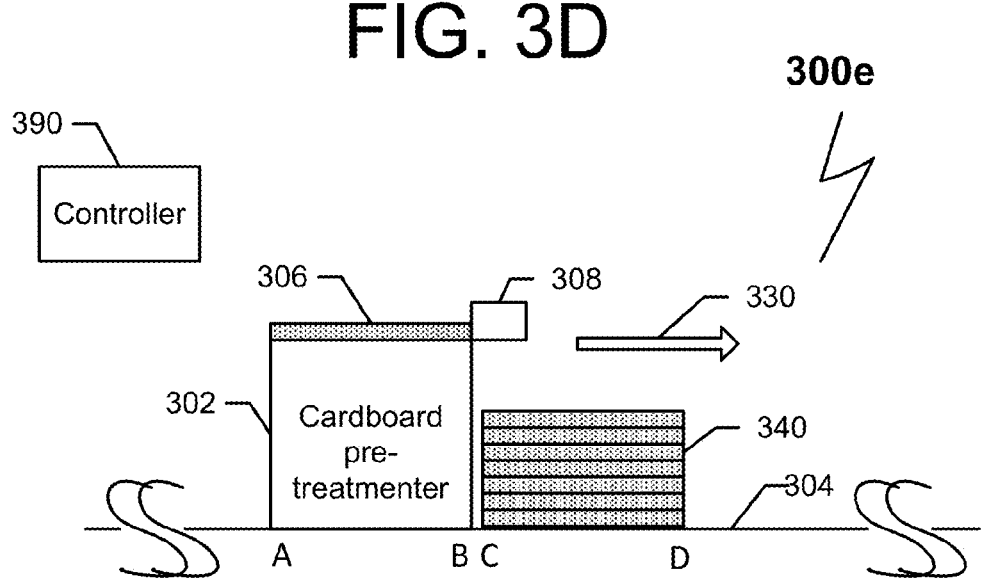

FIG. 3e is a schematic illustration a simplified portion of a block diagram with relevant elements of yet another exemplar embodiment of an automatic-adjustable stacker 300e. In the illustrated embodiment, the AA stacker 300e may be similar to AA stacker in FIG. 3a-c. However, the AA stacker 300e schematically illustrates an example of an embodiment of a collector 304 that is the ground.

Figure 4:
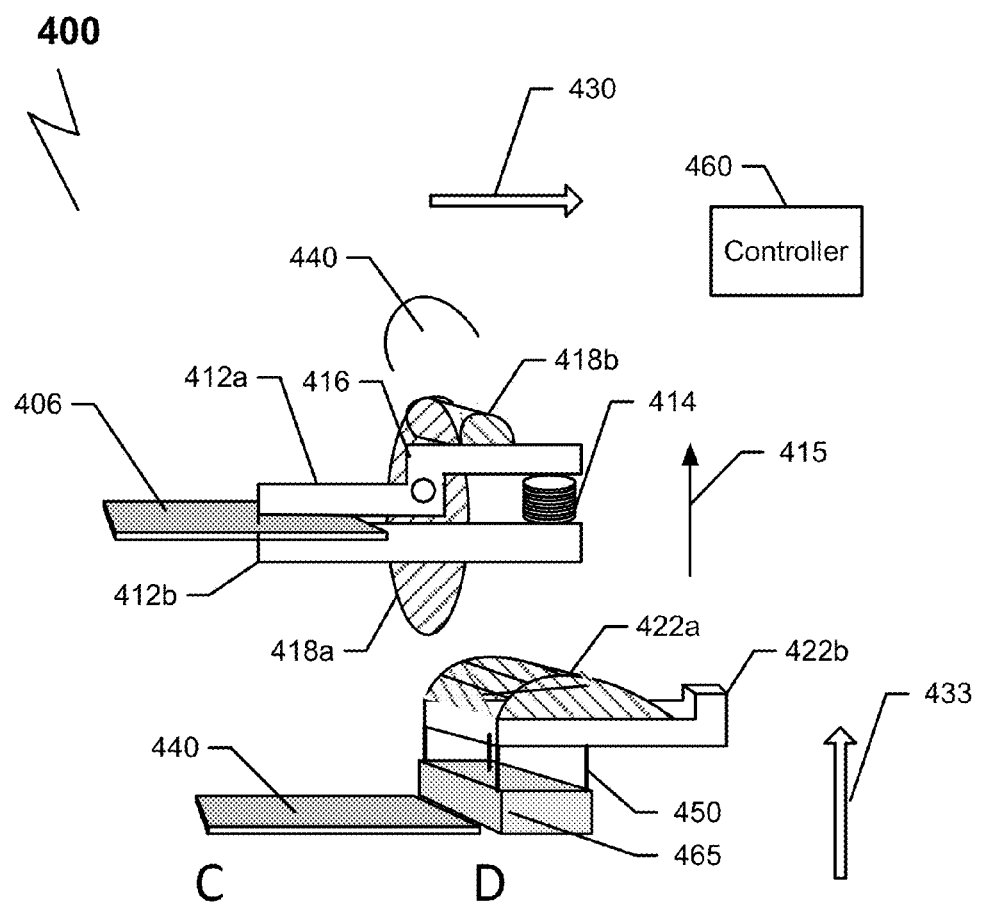
FIG. 4 schematically illustrates a simplified portion of a block diagram with relevant elements of an example of an embodiment of a gripper mechanism; according to teaching of the present disclosure.

FIG. 4 schematically illustrates a simplified portion of a block diagram with relevant elements of an example of embodiment of a gripper mechanism 400. Gripper mechanism 400 may include: a gripping mechanism 412a&b having a clip-like shape as shown in the drawing with elements 412a and 412b surrounding an axis 416, for example. The length of the clip-like shape gripping mechanism may be such that it may easily and securely allow gripping a pre-treated cardboard 406. Advantageously, this element may result in easing of synchronization.

The clip-like shape gripping mechanism may be associated with, or operate in conjunction with a counter spring 414 that may act as a biasing or closing mechanism, narrowing the gap between the clips 412a and 412b, of the clip-like shape gripping mechanism. The counter spring 414 may create or apply a force against the back side of clip 412a in a direction similar to direction of arrow 415, for example. A rod 418b with a D-like shape, for instance, may be associated with an arm 418a.

The D-like shape of the rod 418b may be in contact with one of the clips 412a. The arm 418a may pivot the rod 418b in a direction similar (or reversal) to direction of arrow 440. Thus when the arm 418a pivots, it can pivot the rod 418b such that the arch of the D-like shape creates a counter force to the counter spring 414 force and thus, cause the opening of the gripping mechanism 412a&b by widening the gap between the ends of 412a to 412b that are distal from the counter spring 414.

The gripping mechanism 412a&b, may grip a pre-treated cardboard. Once the gripping mechanism 412a&b has gripped a pre-treated cardboard 406, the arm 418a may pivot in direction similar to arrow 440 (or counter wise) consequently pivoting the rod with the D-like shape to have the flat area of the D-like shape counter the clip 412a. Thus closing the clips 412a and 412b (narrowing the gap between 412a and 421b).

The gripping mechanism 412a&b may pull the pre-treated cardboard 406 toward a pile of pre-treated cardboards (not shown in drawing) in a direction similar to arrow 430, for example.

Further, this exemplary embodiment of the automatic-adjustable stacker 400 may further comprise a gripping-mechanism opener 422a and 422b. The gripping-mechanism opener 422a and 422b may comprise a gradual arch cam shape. When the arm 418a comes against the gripping-mechanism opener 422a the arm will tend to follow the shape of the arch and thus pivot in a direction similar to arrow 440. This action has the consequences of opening the clip-like shape gripping mechanism 412a and b and releasing the pre-treated cardboard at its required place.

The gripping-mechanism opener 422a and 422b may be automatically moved or placed substantially near the locations at which the gripping mechanism 412a and 412b is required to be opened. For example, the gripping-mechanism opener 422a and 422b may be placed substantially near the location at which the gripping-mechanism 412a and 412b is required to open such that it can grip a pretreated cardboard. Further, the gripping-mechanism opener 422a and 422b can be automatically moved to the location at which the gripping-mechanism 412a and 412b is required to release the pre-treated cardboard 440.

The placement of the gripping-mechanism opener 422a and 422b may be adjusted automatically according to the pre-treated cardboard parameters. The parameters include a variety of settings, such as length of the cardboard as a non-limiting example. The placement of the gripping-mechanism opener 422a and 422b may also, or alternatively be adjusted automatically according to the job requirements. The job requirements may include adjustments such as the height of piles, sorting, placement of pile, pre-treated cardboard parameters, etc. as non-limiting examples.

The gripping-mechanism opener 422a and 422b may be automatically adjusted in its placement. The automatic placement may result in moving the gripping-mechanism opener 422a and 422b: in a direction similar or opposite to arrow 430, in direction similar to or opposite to arrow 433, a combination of these directions, etc. The placement of the gripping-mechanism opener 422a and 422b may be by electric actuators, pneumatic actuators motor, linear positioning mechanism, a combination of two or more of these as well as other options including computer controlled, electro-mechanical as well as mechanical.

The gripping mechanism 412a and 412b, with the arm 418a and the rod 418b may be automatically adjusted in there placement. The adjustment placement may be: in a direction similar or opposite to arrow 430, in direction similar to or opposite to arrow 433, a combination of these directions, etc. The placement of the gripping-mechanism opener 422a and 422b may be by electric actuators, pneumatic actuators motor, linear positioning mechanism, a combination of two or more of these as well as other options including computer controlled, electro-mechanical as well as mechanical.

In some embodiments there may be a plurality of gripping mechanisms 412a412b and there may be a plurality of gripping-mechanism openers 422a. Other embodiments may comprise a plurality of gripping mechanisms 412a and 412b associated to a mutual long rod 418b and arm 418a, and having one gripping-mechanism opener 422a.

The gripping-mechanism opener 422a may be associated with a limiter 465. The limiter 465 may be a straightedge-like material. Pre-treated cardboards that are released from the gripping mechanism 412a and 412b by the gripping-mechanism opener 422a may be limited and stopped at the required place one hitting the limiter 465. The limiter 465 parameters may be constant and/or adjustable. Parameters such as but not limited: height, length, etc. The limiter 465 material may be wood, metal, plastic, etc. The association of the limiter to the gripping-mechanism opener 422a may be chains, belts, rods, etc. 450. In some embodiments the distance from the limiter 465 to the gripping-mechanism opener 422a may be automatically adapted according to different criteria. Criteria such as, but not limited to: job description, height of the piled pre-treated cardboards 420, cardboard pre-treatmenter 402 height, and so on.

Some embodiments of the gripper mechanism 400 may further comprise a controller 460. The controller 460 may operate to coordinate or synchronize the different modules of the cardboard-handling system (not shown in the drawing) and the gripper mechanism 400. An example of a controller 460 operation may be to obtain input from: an operator; sensors of one or modules of the cardboard-handling system; from the automatic-adjustable stacker; etc.

The synchronization may be: between the arrival of a pre-treated cardboard 406 and the gripper mechanism 400 of the automatic-adjustable stacker; and/or the placement and/or height of the gripper mechanism 400 modules according to the pre-treated cardboard length/width/placement/velocity; and the like. The controller 460 may command one or more actuators of the gripper mechanism 400 and/or other one or more other modules of the AA stacker.

Some embodiments of automatic-adjustable stackers (AA stackers) may further act as sorters. Advantageously enabling a continuous stacking procedure with no need to stop and readjust for each pile, and/or pretreated cardboard, and/or job. The AA stacker may even act as a collating sorter by providing further control with regards to the adjustments, positioning and movements of the gripper mechanism 400.

Figure 5A:
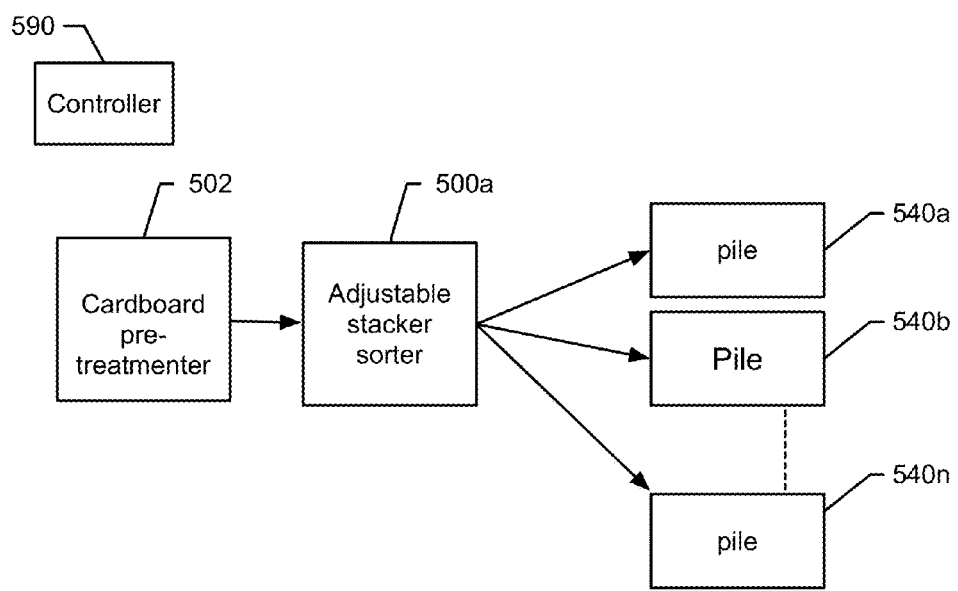
FIG. 5a is a schematic illustration of a conceptual portion of a block diagram with relevant elements of an embodiment of an AA stacker acting as a sorter as well as a stacker.

FIG. 5a is a schematic illustration of a conceptual portion of a block diagram with relevant elements of an embodiment of an AA stacker 500a acting as a sorter as well as a stacker. The AA stacker 500a may obtain pre-treated cardboards (not shown in drawing) from a cardboard pre-treatmenter 502. The AA stacker 500a may automatically adjust itself to transfer the pre-treated cardboard to a relevant pile of pre-treated cardboards 540a,504b or 504n, while ensuring substantially no contact between the transferred pre-treated cardboard and the pile while the cardboard is being transferred and until it reaches its required position. The AA stacker 500a may automatically sort and transfer the pre-treated cardboards according to different criteria. Non-limiting examples of such criteria may include: different piles for different jobs; limitations on the number of pre-treated cardboards that each pile may have; various sorting requirements such as sorting according to languages printed in the pre-treated cardboards; collating and sorting; a combination of two or more of these as well as other options. A controller 590 may control the AA stacker modules and operation. The controller 590 may get information on a job and/or pre-treated cardboard from different modules of the cardboard pre-treatmenter 502, an operator, sensors, etc.

Figure 5B:
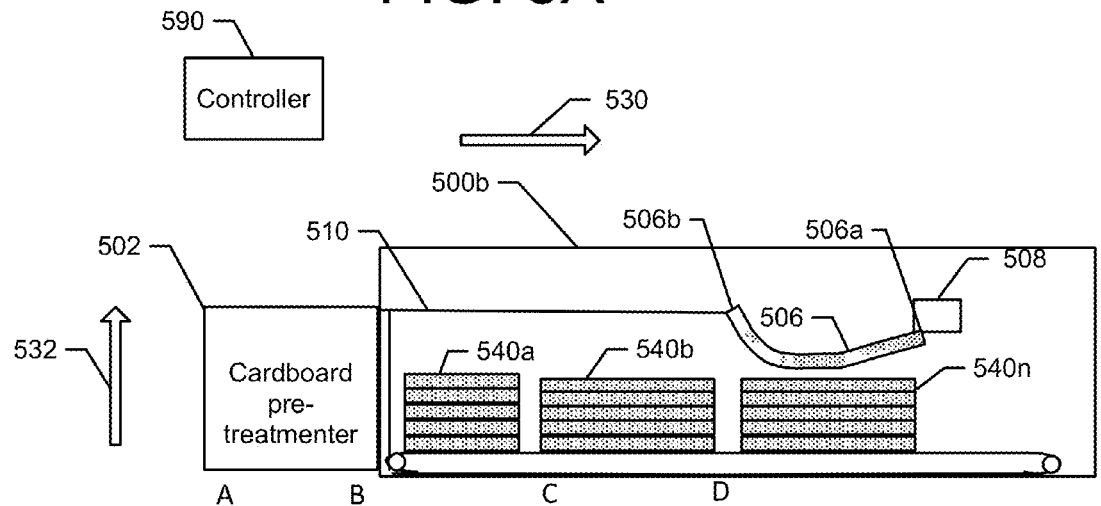
FIG. 5b schematically illustrates a simplified portion of a block diagram with relevant elements of an AA stacker that includes the functionality of sorting, transferring, and stacking pre-treated cardboards; according to teaching of the present disclosure.

FIG. 5b schematically illustrates a simplified portion of a block diagram with relevant elements of an AA stacker 500b that includes the functionality of sorting, transferring, and stacking pre-treated cardboards. Automatic-adjustable stacker (AA stacker) 500b may include: a collector 504, a gripper mechanism 508, and an automatic-adjustable extender 510. The automatic-adjustable extender 510 may be used in a variety of different cases, such as but not limited to, when the collector 504 has a fixed length, when the collector 504 may be required to stay in a fixed position and different lengths of pre-treated cardboards may be used, when two or more piles 540a, 540b, and 540n are required, when different jobs are required to be stacked separately, etc.

The collector 504 may be placed according to the length of the longest pre-treated cardboard to be piled, and the adjusted extender 510 length may be adjusted (in direction similar to the direction indicated by arrow 530) to the pre-treated cardboard length being piled at each time.

In some embodiments of the adjusted extender 510, the extender may have the capability for an automatic adjustment to the height (direction similar or opposite to direction of arrow 532). Thus the height of the automatic adjusted extender 510 may be adjusted according to the height of the highest pile of pre-treated cardboards and/or according to the height of the module before the automatic-adjustable stacker, etc. The automatic adjusted extender 510 may be made of metal, plastic, wood, etc. Its adjusted length and height may be by: electric actuators; pneumatic actuators motor; linear positioning mechanism; a combination of two or more of these as well as other options such as computer control, electro-mechanical controls and simply mechanical.

A controller 590 may control the parameters of the automatic adjusted extender 510 according to the pre-treated cardboard and/or job. The collector may get information from: a cardboard pre-treatmenter 502 preceding the AA stacker; from other modules of the cardboard-handling system (not shown in the drawing) that the cardboard pre-treatmenter 502 is part of; from an operator; from sensors along the path; as well as a combination of two or more these sources as well as others.

Figure 6:
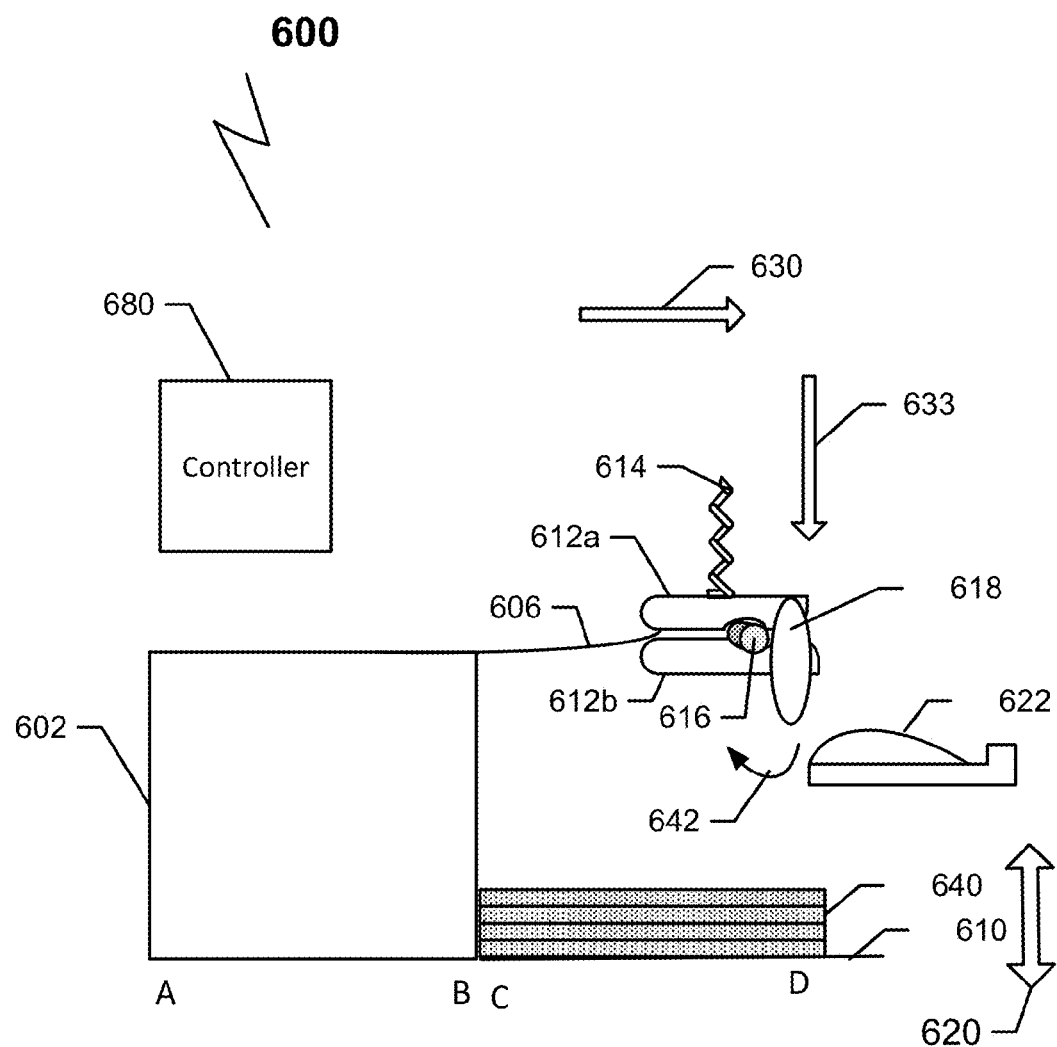
FIG. 6 schematically illustrates another simplified portion of a block diagram with relevant elements of an example of an embodiment of an automatic-adjustable stacker; according to teaching of the present disclosure.

FIG. 6 schematically illustrates another simplified portion of a block diagram with relevant elements of an example of an embodiment of an automatic-adjustable stacker 600. The automatic-adjustable stacker 600 may transfer a pre-treated cardboard 606 from a cardboard pre-treatmenter 602, for example, to a pile of pre-treated cardboards 640 piled in a collector 610. In some embodiments, the automatic-adjustable stacker 600 may be placed after a different module of a cardboard-handling system. For instance, the automatic-adjustable stacker 600 may be placed, after modules such as a laser, a die-rule and counter die, a conveyor, a printer, as well as other modules or elements of a cardboard-handling system or similar systems that operate with other media that may have similar characteristics.

The automatic-adjustable stacker 600 may transfer the pre-treated cardboard 606 to the top surface of the pre-treated cardboard pile 640, while ensuring minimum contact between the transferred pre-treated cardboard 606 and the surface of the pile 640 (or the collector 610 for the firsts processed cardboard) until the transferred pre-treated cardboard 606 reaches a required place. An example of a required place may be: when the leading edge of the pre-treated cardboard 606 has reached point D of the collector 610.

In some embodiments, an automatic-adjustable stacker 600 may automatically adjust the placement of the collector 610 (in directions similar to arrow 630 or in the opposite direction) to a required place, relative to the cardboard pre-treatmenter 602. The required place for the collector 610 may be placement of point C of the collector 610 adjacent to the final edge (point B) of the cardboard pre-treatmenter 602.

Other examples of the required placement may be based on the length of the pre-treated cardboard. For example, the point D of the collector 610 may be adjusted to a certain distance from point B of the pre-treatmenter 602 based on the length of the pre-treated cardboard 606 that needs to be transferred. The length of the pre-treated cardboard 606 may be entered by an operator and/or may be measured by one or more sensors along the cardboard-handling system of which the cardboard pre-treatmenter 602 is operating.

An automatic-adjustable stacker 600 may get the leading edge of a pre-treated cardboard 606 that needs to be transferred by a gripping mechanism 612a and 612b, for example. The gripping mechanism 612a and 612b may grip the pre-treated cardboard leading edge from substantially the end edge (point B) of the cardboard pre-treatmenter 602, and lead or guide it toward the pile 640 of pre-treated cardboards piled in the collector 610 (or the collector 610 for the first fed cardboard) in a direction similar to direction shown by arrow 630, while the trailing edge is supported on the pre-treatmenter 602.

The gripping mechanism 612a and 612b may release the pre-treated cardboard 606 when its leading edge reaches a required place or position. For example, the required place may be: when leading edge of the pre-treated cardboard 606 is substantially close to point D of the collector 610; and/or when the trailing edge of the pre-treated cardboard 606 is substantially close to point B of the pre-treatmenter 602.

Some embodiments of the gripping mechanism 612a and 612b may comprise a clip-like shape as shown in the drawing: 612a and 612b surrounding an axis 616. The clip-like shape gripping mechanism may further comprise a counter spring 614 that may act as a closing mechanism of the clip-like shape gripping mechanism, by imposing force in a direction similar to direction of arrow 633 or biasing the upper portion of the clip 612a in the direction of arrow 633. The length of the clip-like shape gripping mechanism may be such that it may allow gripping a pre-treated cardboard 606 easily.

An arm 618 may be associated with one of the portions of the clip, such as the upper portion of the clip 612a, for instance. The arm 618 may pivot in a direction similar to arrow 642, thus creating a counter force to the spring 614 and opening the gripping mechanism 612a and 612b. The automatic-adjustable stacker 600 may further include a gripping-mechanism opener 622. The gripping-mechanism opener 622 may comprise a gradual arch cam. When the gripping mechanism grips the pre-treated cardboard 606 from its leading edge and pulls it toward the pile of pre-treated cardboards 640 in a direction similar to direction shown by arrow 630, the gripping-mechanism opener 622 may be placed automatically substantially near the place where the pre-treated cardboards 606 is required to be released (point D for, example).

The arm 618 may follow the gradual arch cam of the gripping-mechanism opener 622 when the arm 618 comes in contact with the gripping-mechanism opener 622 and thus, cause the arm 618 to pivot in a clockwise direction similar to arrow 642. The interaction of the arm 618 against the cap 622 results in opening the clip-like shape gripping mechanism 612a and 612b and releasing the pre-treated cardboard 606 at its required place. The placement of the gripping-mechanism opener 622 may be adjusted automatically according to the length of the pre-treated cardboard 606, for example.

The gripping-mechanism opener 622 placement may be automatically adjusted to open the gripping mechanism 612a and 612b when the gripping mechanism 612a and 612b gets the pre-treated cardboard from the edge of the cardboard pre-treatmenter 602. And the gripping-mechanism opener 622 placement may be automatically adjusted to open the gripping mechanism 612a and 612b when the pre-treated cardboard 606 needs to be released. The gripping-mechanism opener 622 placement may be automatically adjusted by: auto electric actuator; pneumatic actuator; motor linear positioning mechanism, computer controlled devices, electro-mechanical as well as mechanical devices, etc.

In some embodiments in which there may be a plurality of sets of gripping mechanisms 612a and 612b there may be a plurality of gripping-mechanism openers 622. Other embodiment may comprise a single gripping-mechanism opener 622 and have the arm 618 associated to the plurality of clip-like shapes 612a the plurality of gripping mechanisms. The association may be via a mutual rod (not shown in drawing) that may be long and pass through the plurality of clip-like shape gripping mechanism, for example.

The height 626 of the gripping mechanism 612a and 612b and/or the gripping-mechanism opener 622 may be automatically adapted according to different criteria. Criteria such as, but not limited to: job description, the height 620 of the piled pre-treated cardboards, the height of the cardboard pre-treatmenter 602, etc. Basically, the gripping-mechanism 612*a* and 612*b* and the gripping-mechanism opener 622 can be adjust automatically during operation to help reduce destructive forces that may be imposed on the cardboard 606.

Some embodiments of an AA stacker 600 may further comprise a controller 680. The controller 680 may synchronize between the different modules of the cardboard pre-treatmenter 602 and the automatic-adjustable stacker 600. The controller 680 may obtain inputs from: an operator; sensors along the path of the cardboard pre-treatmenter 602; the AA stacker 600; and so on.

The synchronization may be: between the arrival of a pre-treated cardboard 606 and the gripping mechanism 612*a* and 612*b* of the AA stacker 600; and/or the placement and/or height of the AA stacker modules (gripping mechanism 612*a* and 612*b* and/or opener 622) according to the length, width, placement and/or velocity of the pre-treated cardboard 606; or the like. The controller 680 may command one or more actuators of the AA stacker modules 600 and/or one or more other modules of the cardboard pre-treatmenter 602.

Figure 7:
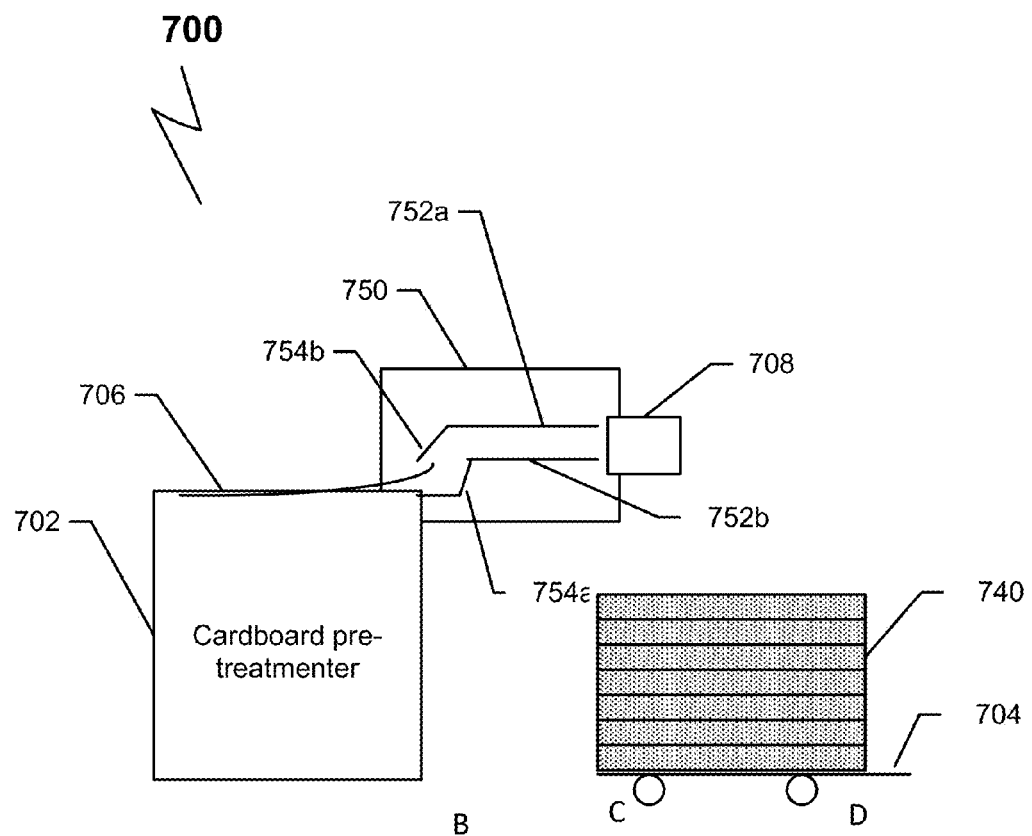
FIG. 7 schematically illustrates a simplified portion of a block diagram with relevant elements of an example of an embodiment of an AA stacker's cardboard guide.

FIG. 7 schematically illustrates a simplified portion of a block diagram with relevant elements of an example of an embodiment of an AA stacker 700. AA stacker 700 may be similar to the AA stacker illustrated in FIG. 3*a-e* and may further comprise a cardboard-guider 750. Some embodiments of a cardboard-guider 750 may comprise a lifter 754*a* and a director 754*b*.

The lifter 754*a* and the director 754*b* may be substantially flat objects with a pre-defined angle that corresponds to and interfaces with the cardboard pre-treatmenter's 702 surface to which the cardboard-guider 750 may be automatically associated. As a non-limiting example, the angle may be 15 degrees for both the lifter 754*a* and the director 754*b*. The angel may be automatic adjustable in some embodiments. The adjustments may be based on parameters of a pre-treated cardboard 706, for example, such as but not limited to: fiber direction, thickness, width, length, layout, etc.

The angle of the lifter 754*a* may be such that a when a pre-treated cardboard 706, conveyed toward the cardboard-guider 750 via a module of the pre-treatmenter 702, encounters the angle of the lifter 754*a* it will be forced to rise or be lifted. Once lifted, it will encounter the director 754*b* which angle will lower the pre-treated cardboard 706 toward a guider 752*a* and 752*b*. Through the guider 752*a* and 752*b* the pre-treated cardboard 706 may move forward toward the automatic-adjustable gripper mechanism 708 of the automatic-adjustable stacker 700. The gripper mechanism 708 may then grab the pre-treated cardboard 706 and convey it toward a pile 740 of pre-treated cardboards previously received and placed on a collector 704.

Figure 8A:
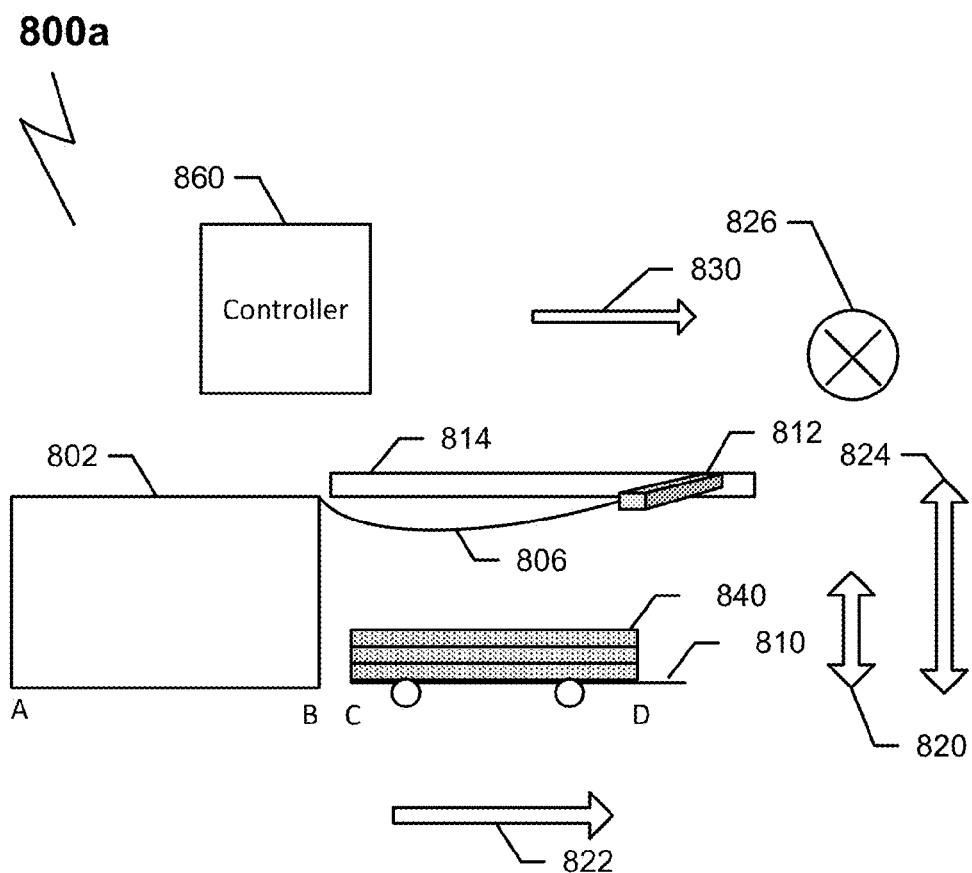
FIG. 8a schematically illustrates a simplified portion of a block diagram with relevant elements of another example of an embodiment of an AA stacker; according to teaching of the present disclosure.

FIG. 8*a* schematically illustrates a simplified portion of a block diagram with relevant elements of another exemplary embodiment of an AA stacker 800*a*. The AA stacker 800*a* may transfer a pre-treated cardboard 806 from a cardboard pre-treatmenter 802, for example, to a pile 840 of pre-treated cardboards piled in a collector 810. In some embodiments, the AA stacker 800 may be placed after different or additional modules of a cardboard pre-treatmenter 802. Thus, the AA stacker 800 may be placed, after modules such as, but not limited to, a laser, a die-rule and counter die, a conveyor, a printer, and so on.

The AA stacker 800 may transfer the pre-treated cardboard 806 to the top surface of the pre-treated cardboard pile 840, while ensuring minimum contact between the transferred pre-treated cardboard 806 and the surface of the pile 840 until the transferred pre-treated cardboard 806 reaches a required place. The required place or position may when the leading edge of the pre-treated cardboard 806 has reached point D of the collector 810, for instance.

In some embodiments, an AA stacker 800*a* may automatically adjust the placement of the collector 810 (in directions similar to arrow 822 or in the opposite direction) to a required place or position, relative to the cardboard pre-treatmenter 802. The required place or position may be placement of point C of the collector 810 adjacent to the final edge (point B) of the cardboard pre-treatmenter 802, or a certain distance relative to the front edge (point A) of the cardboard pre-treatmenter 802, for instance.

Other examples of placement may be based on the length of the pre-treated cardboard 806 and the distance point D of the collector 810 needs to be from point B of the pre-treatmenter 802 to accommodate the lengths of the pre-treated cardboard 806 dimension parameters that are being transferred. The length of the pre-treated cardboard 806 may be entered by an operator and/or may be measured by one or more sensors along the cardboard pre-treatmenter 802, for example.

An exemplary AA stacker 800*a* may receive the leading edge of a pre-treated cardboard 806 that needs to be transferred, by a gripping mechanism 812, for example. The gripping mechanism 812 may grip the leading edge of the pre-treated cardboard 806 from substantially the edge of the cardboard pre-treatmenter 802, and lead or guide it toward a pile 840 of pre-treated cardboards piled in the collector 810 in a direction similar to direction shown by arrow 830, while the trailing edge is supported on the pre-treatmenter 802.

The gripping mechanism 812 may release the pre-treated cardboard 806 when the leading edge of the pre-treated cardboard 806 reaches a required place or position. Examples of required positions may be point D of the collector 810 and/or when the trailing edge of the pre-treated cardboard 806 passes point B of the pre-treatmenter 802.

The gripping mechanism 812 may be associated to a bar 814. The association may be by wheels on a track, a belt, rotating chain mechanism, linear guide motor, rails, rollers, etc. The gripping mechanism 812 may move along the bar 814 in a direction similar to arrow 830 and/or reversal. The height 824 of the gripping mechanism 812 and the bar 814 may be adapted according to different criteria, such as, but not limited to: job description, height of the piled pre-treated cardboards 820, cardboard pre-treatmenter 802 height, the job layout, etc.

In some embodiments the bar 814 and/or gripping mechanism 812 may move in direction similar or opposite to arrow 826 (perpendicular to arrow 830). In other embodiments a combination of the different directions may be embodied. The gripping mechanism 812 may comprise a plurality of automatic-adjustable grippers. Examples of grippers may be, but not limited to: clamps, grippers, vacuum, a combination of these as well as others. In some embodiments the plurality of automatic-adjustable grippers 812 may be individual sub units, and/or an array of automatic-adjustable grippers 812 connected to a single rod, and so on.

Some embodiments may further comprise a controller 860. The controller may synchronize between the different modules of the cardboard pre-treatmenter 802 and the AA stacker 800*a*. An exemplary controller 860 may obtain input from: an operator; sensors; one or modules of a cardboard-handling system of which the cardboard pre-treatmenter 802 is part; from the automatic-adjustable stacker 800*a*; etc.

The synchronization may be: between the arrival of a pre-treated cardboard 806 and the gripping mechanism 812 of the automatic-adjustable stacker; and/or the placement and/or height of the automatic-adjustable stacker modules according to the length, width, placement and/or velocity of the pre-treated cardboard 806; and the like. The controller 860 may command or control one or more actuators of the automatic-adjustable stacker modules and/or other one or more other modules of the cardboard-handling system that the cardboard pre-treatmenter 802 is part of.

Thus the controller may control a continuous motion the AA stacker 800a and the movement of the pre-treated cardboard 806. Advantageously, the pre-treated cardboard 806 does not have to be stopped and accelerated which helps to alleviate or prevent separation and damage of the pre-treated cardboard 806. Advantageously, such handling results in the benefit of using less joints 214a-e (FIG. 2b) in the cardboard.

Figure 8B:
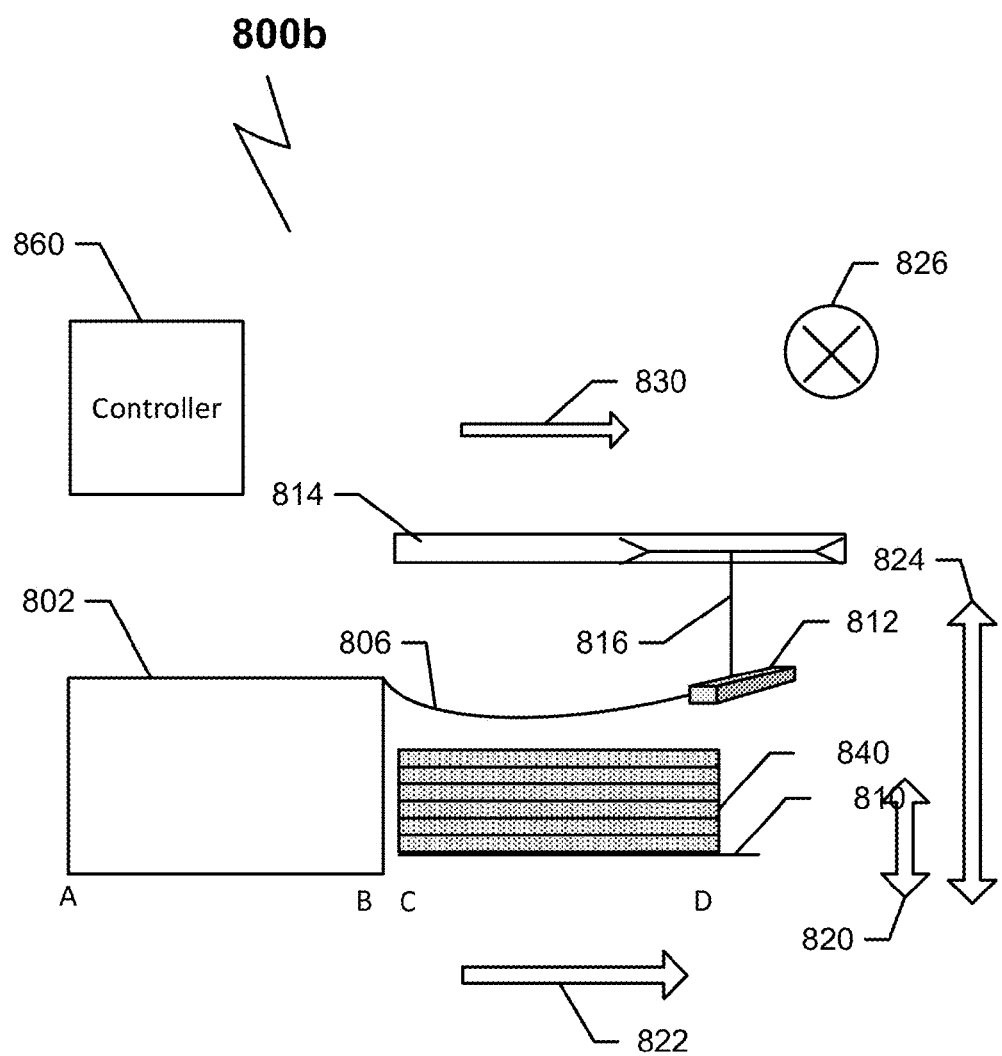
FIG. 8b schematically illustrates a simplified portion of a block diagram with relevant elements of yet another example of an embodiment of an AA stacker; according to teaching of the present disclosure.

FIG. 8b schematically illustrates a simplified portion of a block diagram with relevant elements of yet another exemplary embodiment of an AA stacker 800b. The illustrated AA stacker 800b may be similar to AA stacker 800a. In the illustrated AA stacker 800b, the gripper mechanism 812 may be associated with the bar 814 using one or more links linear guide 816, for example. The one or more links linear guide 816 may be associated with the bar 814 by wheels on a track, for example. The gripping mechanism 812 may move along the bar 814 in a direction similar to arrow 830 and/or reversal, for instance.

The height 824 of the gripping mechanism 812 may be automatically adjusted based on different criteria, such as, but not limited to: the job description, the pile height of the pre-treated cardboards 820, the height of the cardboard pre-treatmenter 802, etc. The gripping mechanism 812 may comprise a plurality of automatic-adjustable grippers.

Figure 8C:
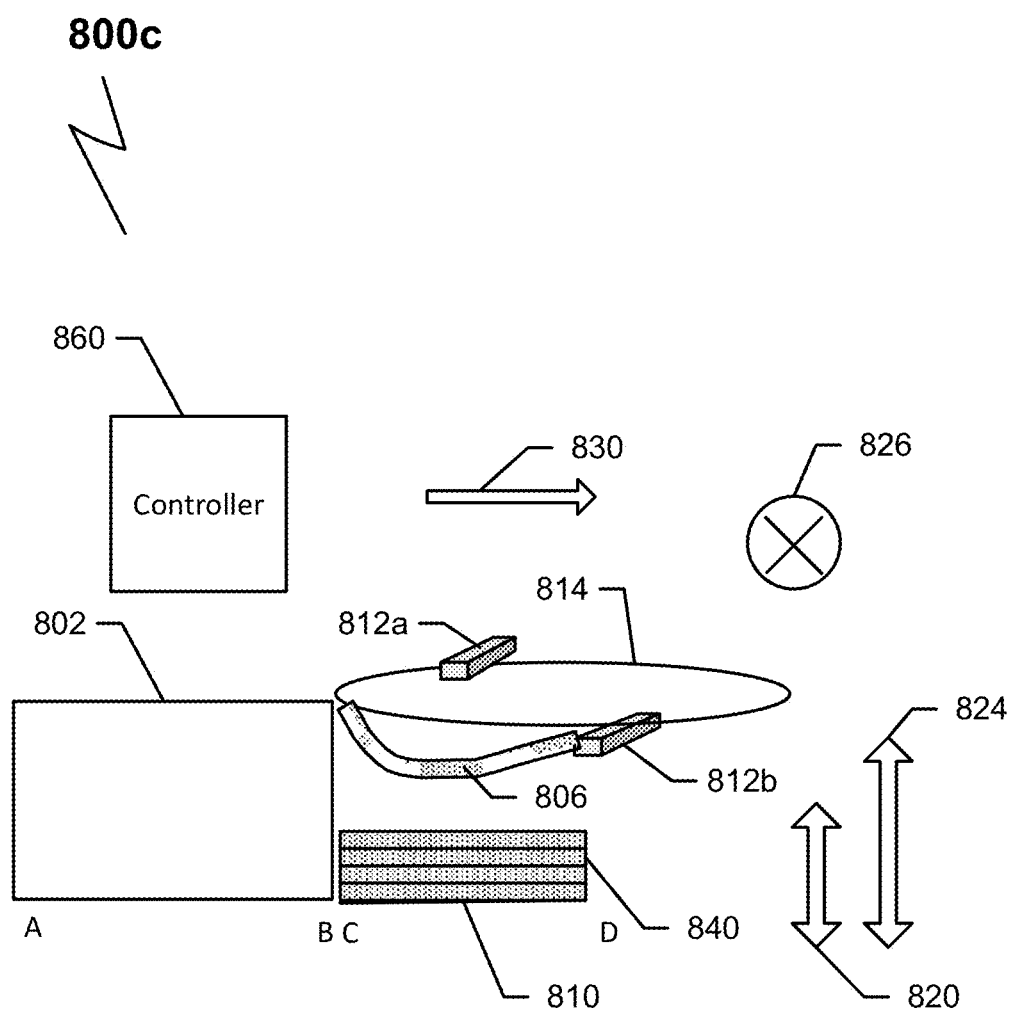
FIG. 8c schematically illustrates a simplified portion of a block diagram with relevant elements of yet another example of an embodiment of an AA stacker; according to teaching of the present disclosure

FIG. 8c schematically illustrates a simplified portion of a block diagram with relevant elements of yet another exemplary embodiment of an AA stacker 800c. The AA stacker 800c may be similar to the AA stacker 800a illustrated in FIG. 8a. In AA stacker 800c, the gripper mechanism 812a and 812b may be associated with a cyclic belt 814. The cyclic belt 814 may be automatically adjusted in its length, in its height 824, in its placement similar or opposite to the direction of arrows 830 and/or 826 etc.

Associated with the cyclic belt 814 maybe one or more gripper mechanisms 812a and 812b. The distance between the two or more gripper mechanism 812a and 812b may be automatically adjusted according to the maximum length of the pre-treated cardboard 806 that needs to be transferred from the cardboard pre-treatmenter 802 to the collector 810, for instance.

Other embodiments of the AA stackers may operate to get the pre-treated cardboard at both of its edges.

Figure 9A:
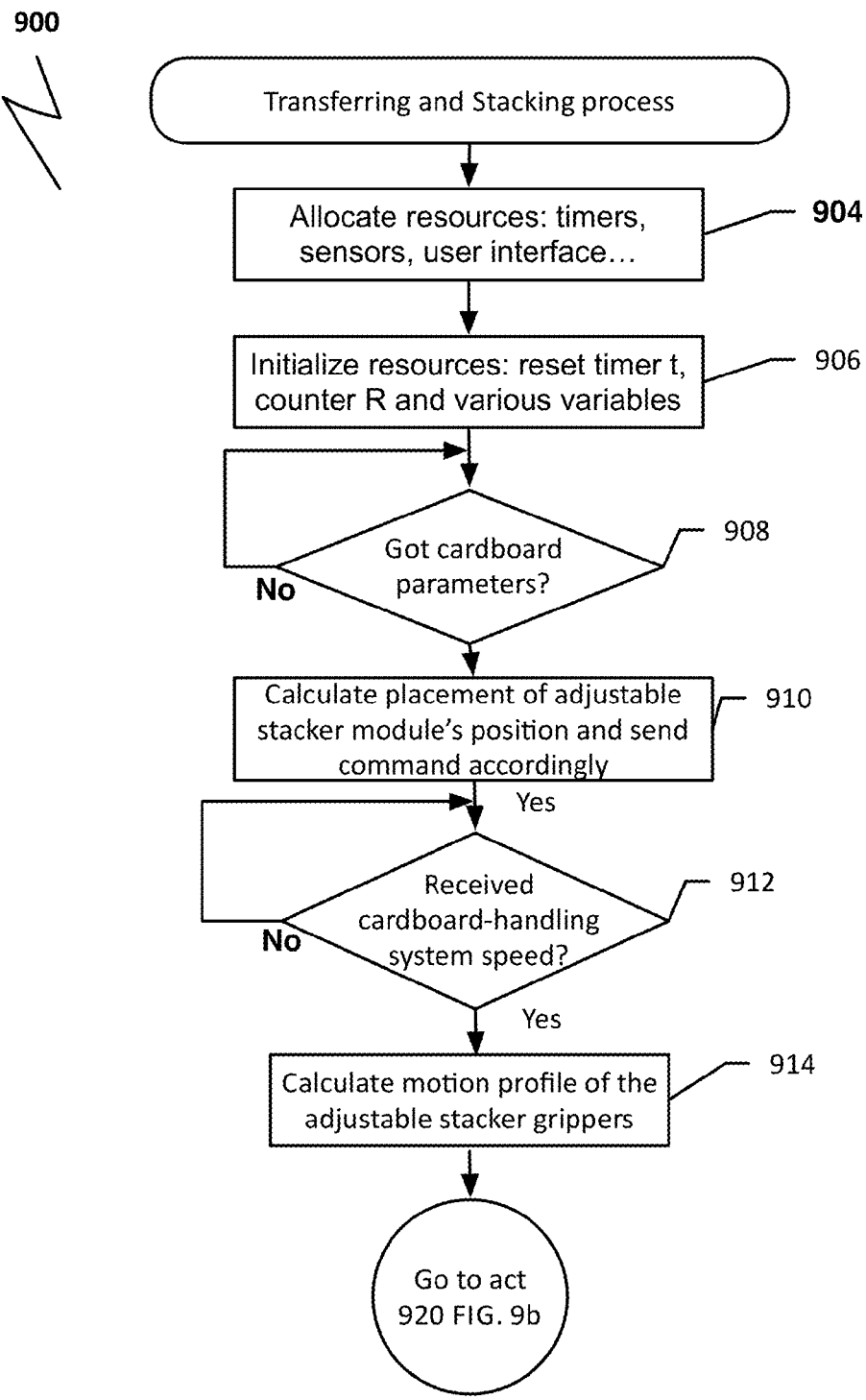
FIG. 9a and FIG. 9b are flowchart diagrams illustrating various relevant actions of an exemplary embodiment of method that may be implemented by various embodiments of the AA stacker; according to teaching of the present disclosure.
Figure 9B:
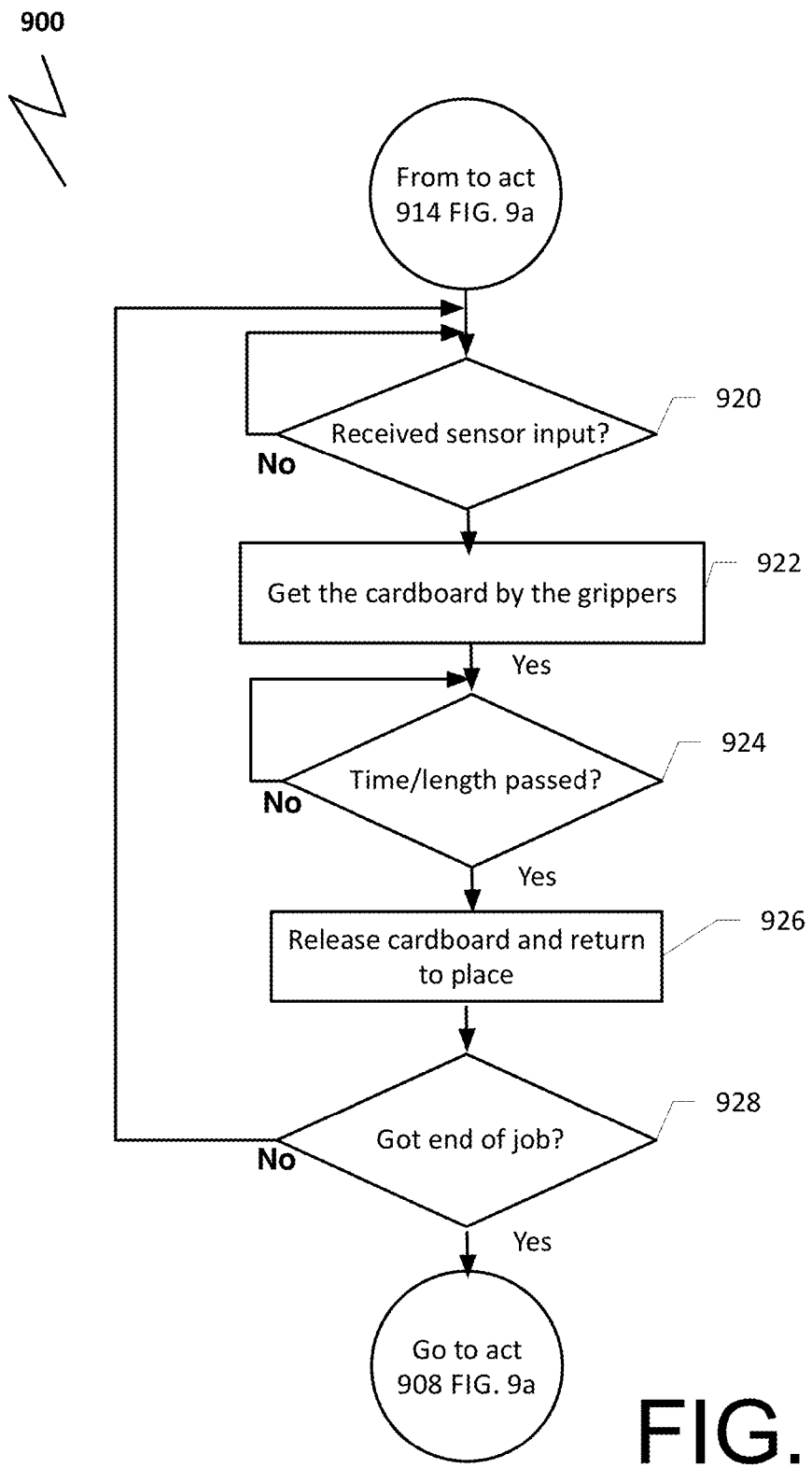

FIG. 9a and FIG. 9b are flowchart diagrams illustrating various actions of an exemplary embodiment of method 900 that may be implemented by various embodiments of the AA stacker. Method 900 can be used for transferring and stacking pre-treated cardboards while ensuring minimum contact between the transferred pre-treated cardboard and the pile of pre-treated cardboards, until the moving cardboard reaches its final destination.

Method 900 may begin at power up of a system in which it is part of, and/or when stacking of pre-treated cardboard is required. Method 900 may be software instructions, stored in a memory element and read out and executed by a controller, for example. At act 904, method 900 may allocate different resources. The allocated resources may include resources such as, but not limited to: timers, sensors, memory storage, inputs from a user, etc. Inputs from a user may be pre-treated cardboard parameters, for instance. Pre-treated cardboard parameters may include metrics such as the: length, thickness, width, velocity, etc. Other inputs may be: the number of pre-treated cardboards that need to be piled in each pile, the number of proof (sampling pre-treated cardboards) in another place for sampling (sampling tray, for instance), etc.

After such allocations, an initialization sequence 906 may begin. Initialization may include: resetting one or more timers, counters, commands for placement of modules, homing position, etc. Next, the method 900 may wait 908 for information on pre-treated cardboards parameters and/or on pile requirements, etc. According to information thus obtained, the method 900 may determine 910 the required placement of different modules of an AA stacker and send the appropriate commands may be sent 910 toward the relevant modules. For example: the placement of the collector of the AA stacker; placement of a gripping-mechanism opener 822; placement a gripping-mechanism, etc.

Information regarding the pre-treated cardboard arriving from a module before the automatic-adjustable stacker may be obtained 912. For instance, this information may include the velocity, speed, weight, etc. of the pre-treated cardboard. Accordingly, velocity of the gripping mechanism and/or gripping-mechanism opener 822 of the AA stacker may be determined and/or obtained 914 by the relevant modules. A motion profile may be calculated and determined. Motion profile may include: placements of modules, their velocity, accelerations and so on.

Next method 900 may wait 920 for a pre-treated cardboard to pass a certain area. A sensor may detect that the pre-treated cardboard has passed the certain area and up-date method 900. Placement may be substantially the end edge of a module right before the AA stacker, for instance.

The automatic-adjustable grippers of the AA stacker may then grab the pre-treated cardboard and pull 922 it toward the required place. Examples of a required place may be the point at which the trailing edge of the pre-treated cardboard reaches substantially the end of the end edge of a module right before the AA stacker, for example. This may be determined 924 according to information on the pre-treated cardboard's length, the velocity of the automatic-adjustable gripper of the AA stacker, the time passed, input from one or more sensors, a combination of these as well as other options.

Accordingly, the pre-treated cardboard may be released 926 from the automatic-adjustable grippers. If 928 more pre-treated cardboards are needed to be transferred, the method 900 may return to act 920 to receive the next cardboard. Otherwise, if no additional cardboards remain to be transferred 928 the method 900 may return to act 908 FIG. 9a.

Figure 10:
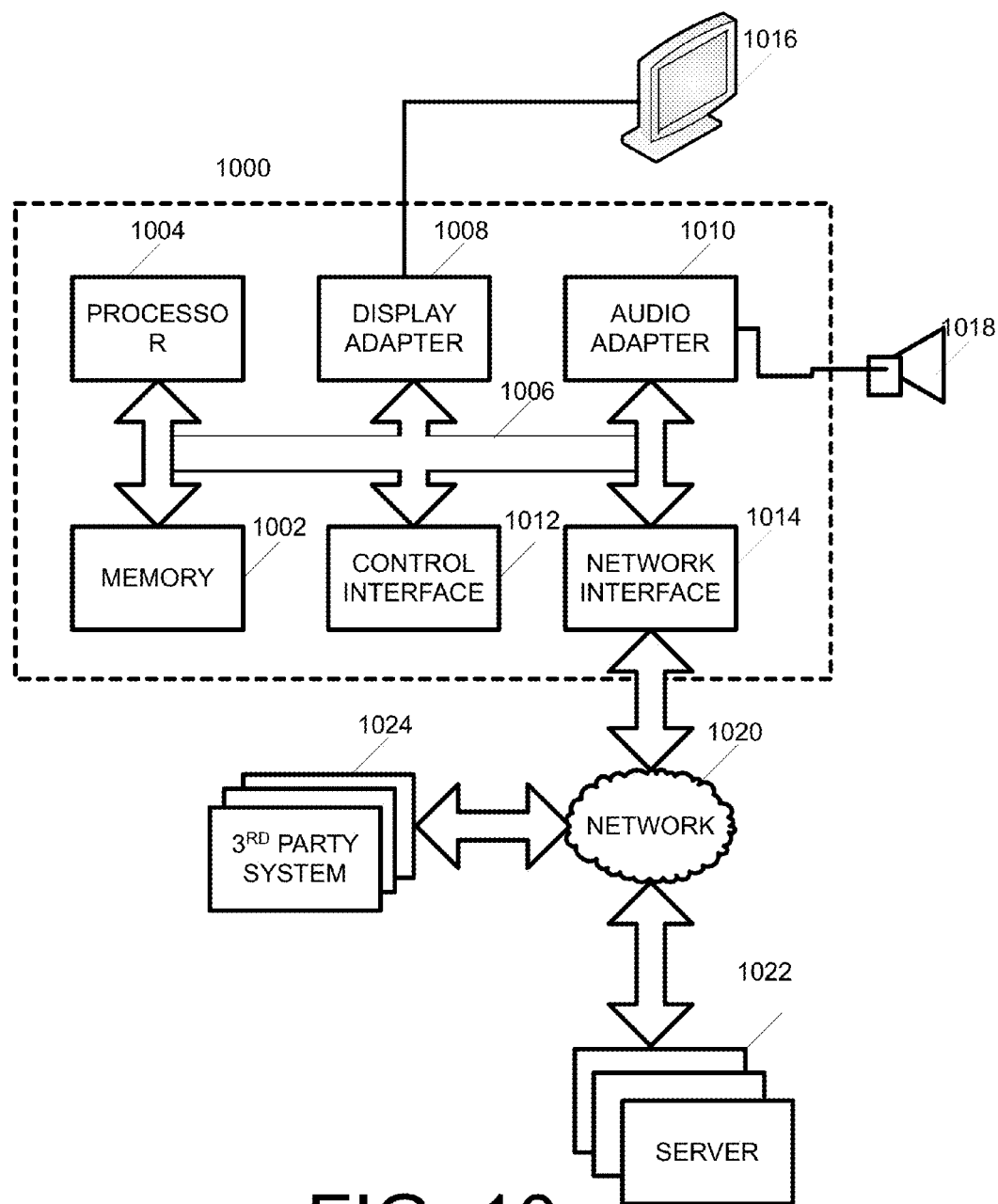
FIG. 10 is a functional block diagram of exemplary components that can be incorporated into various embodiments of a system or sub-system operating as a controller or processor, as well as other modules within a cardboard handling system.

FIG. 10 is a functional block diagram of exemplary components that can be incorporated into various embodiments of a system or sub-system operating as a controller or processor, as well as other modules within a cardboard handling system. It will be appreciated that not all of the components illustrated in FIG. 10 are required in all embodiments or elements of cardboard handling system but, each of the components are presented and described in conjunction with FIG. 10 to provide a complete and overall understanding of the components. Thus, any of the described embodiments as well as variants thereof, and functions or sub-systems within the various embodiments may include software that operates in a platform similar to the illustrated platform 1000 of FIG. 10.

The controller can include a general computing platform 1000 illustrated as including a processor 1004 and memory device 1002 that may be integrated with each other or communicatively connected over a bus or similar interface 1006. The processor 1004 can be a variety of processor types including microprocessors, micro-controllers, programmable arrays, custom IC's etc. and may also include single or multiple processors with or without accelerators or the like. The memory element of 1002 may include a variety of structures, including but not limited to RAM, ROM, magnetic media, optical media, bubble memory, FLASH memory, EPROM, EEPROM, etc.

The processor 1004, or other components in the controller may also provide components such as a real-time clock, analog to digital convertors, digital to analog convertors, etc. The processor 1004 also interfaces to a variety of elements including a control interface 1012, a display adapter 1008, an audio adapter 1010, and network/device interface 1014. The control interface 1012 provides an interface to external controls such as but not limited to: sensors, actuators, AA stacker modules, leading mechanism, drums, step motors, a keyboard, a mouse, a pin pad, an audio activated device, as well as a variety of the many other available input and output devices or, another computer or processing device or the like.

A display adapter 1008 can be used to drive a variety of alert elements 1016, such as, but not limited to: display devices including an LED display, LCD display, one or more LEDs or other display devices. An audio adapter 1010 may interface to and drive another alert element 1018, such as a speaker or speaker system, buzzer, bell, etc. A network/interface 1014 may interface to a network 1020 which may be any type of network including, but not limited to the Internet, a global network, a wide area network, a local area network, a wired network, a wireless network or any other network type including hybrids. Through the network 1020, or even directly, the controller 1000 can interface to other devices or computing platforms such as but not limited to: one or more servers 1022 and/or third party systems 1024. A battery or power source may provide power for the controller 1000.

Exemplary embodiments of the AA stacker may further comprise a pre-treated cardboard leader. An example of a pre-treated cardboard leader may lead the pre-treated cardboard toward a required direction, for example. An embodiment of a pre-treated cardboard leader may further straighten the pre-treated cardboard.

Unless otherwise defined, all technical and/or scientific terms used herein have the same meaning as commonly understood by one of ordinary skill in the art to which the disclosure pertains. In case there is a conflict in the definition or meaning of a term, it is intended that the definitions presented within this specification are to be controlling. In addition, the materials, methods, and examples that are presented throughout the description are illustrative only and are not necessarily intended to be limiting.

Reference in the specification to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily referring to the same embodiment or all embodiments.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof and with or without employment of an operating system. Software may be embodied on a computer readable medium such as a read/write hard disc, CDROM, Flash memory, ROM, etc. In order to execute a certain task, a software program may be loaded into or accessed by an appropriate processor as needed.

The foregoing description is not intended to summarize each potential embodiment or every aspect of the present disclosure, and other features and advantages of the present disclosure will become apparent upon reading the following detailed description of the embodiments with the accompanying drawings and appended claims.

Furthermore, although specific embodiments are described in detail to illustrate the inventive concepts to a person of ordinary skill in the art, such embodiments are susceptible to various modifications and alternative forms. Accordingly, the figures and written description are not intended to limit the scope of the inventive concepts in any manner.

In the description and claims of the present disclosure, each of the verbs, "comprise", "include" and "have", and conjugates thereof, are used to indicate that the object or objects of the verb are not necessarily a complete listing of members, components, elements, or parts of the subject or subjects of the verb and further, all of the listed objects are not necessarily required in all embodiments.

As used herein, the singular form "a", "an" and "the" include plural references unless the context clearly dictates otherwise. For example, the term "a material" or "at least one material" may include a plurality of materials, including mixtures thereof.

In this disclosure the words "unit", "element", and/or "module" are used interchangeably. Anything designated as a unit, element, and/or module may be a stand-alone unit or a specialized module. A unit, element, and/or module may be modular or have modular aspects allowing it to be easily removed and replaced with another similar unit, element, and/or module. Each unit, element, and/or module may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

The present disclosure has been described using detailed descriptions of embodiments thereof that are provided by way of example and are not intended to limit the scope of the disclosure. The described embodiments comprise different features, not all of which are required in all embodiments of the disclosure. Some embodiments of the present disclosure utilize only some of the features or possible combinations of the features. Many other ramifications and variations are possible within the teaching of the embodiments comprising different combinations of features noted in the described embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention.

It will be appreciated by persons skilled in the art that the present disclosure is not limited by what has been particularly shown and described herein above. Rather the scope of the disclosure is defined by the claims that follow.

What is claimed is:

1. An automatic-adjustable stacker, comprising:
 a controller that obtains information on a length of a pre-treated cardboard; and
 an automatic-adjustable gripper mechanism;

wherein the controller synchronizes the automatic-adjustable gripper mechanism with the arrival of a leading edge of a pre-treated cardboard at substantially an end-edge of a module preceding the automatic-adjustable stacker, the automatic-adjustable gripper mechanism operating to:

grip the leading-edge of the pre-treated cardboard from the substantially end-edge of the module preceding the automatic-adjustable stacker, transfer the pre-treated cardboard toward a desired location; and release the transferred pre-treated cardboard when a trailing-edge of the pre-treated cardboard is proximate to the end-edge of the module preceding the automatic-adjustable stacker, based at least in part on the length of the pre-treated cardboard obtained by the controller, wherein a concavity-like shape is created to the pre-treated cardboard while it is being transferred.

2. The automatic-adjustable stacker of claim 1, further comprising an automatic-adjustable extender that is placed substantially near the end-edge of the module preceding the automatic-adjustable stacker, wherein the length of the automatic-adjustable extender is automatically adjusted according to commands received from the controller, and wherein the automatic-adjustable gripper mechanism operates to:

transfer the pre-treated cardboard toward the desired location by transferring the pre-treated cardboard along the automatic-adjustable extender; and release the transferred pre-treated cardboard when the trailing-edge of the pre-treated cardboard substantially reaches the end-edge of the automatic adjustable extender wherein a concavity-like shape is created to the pretreated cardboard while it is being transferred.

3. The automatic-adjustable stacker of claim 2, wherein the automatic-adjustable stacker sorts a plurality of cardboards into two or more piles of pre-treated cardboards by automatically adjusting the length of the automatic-adjustable extender according to commands obtained from the controller.

4. The automatic-adjustable stacker of claim 1, further comprising an automatic-adjustable limiter that stops the pre-treated cardboards inertia movement, when released from the automatic-adjustable gripper mechanism, wherein the automatic-adjustable limiter is automatically positioned according to the length of the pre-treated cardboard.

5. The automatic-adjustable stacker of claim 1, wherein the controller is configured to obtain information on the length of the pre-treated cardboard from one or more sensors.

6. The automatic-adjustable stacker of claim 1, wherein the controller is configured to obtain information on the length of the pre-treated cardboard from a job description.

7. The automatic-adjustable stacker of claim 1, further comprise an automatically adjusted collector.

8. The automatic-adjustable stacker of claim 7, wherein the collector length is automatically adjusted according the length of the pre-treated cardboard.

9. The automatic-adjustable stacker of claim 7, wherein the location of the collector is automatically adjusted according to the length of the pre-treated cardboard.

10. The automatic-adjustable stacker of claim 1, wherein the automatic-adjustable gripper mechanism comprise a clip that is operative to hold the cardboard.

11. The automatic-adjustable stacker of claim 10, further comprise an automatic-adjustable gripping-mechanism opener having a gradual arch cam shape that cooperatively interacts with the automatic-adjustable gripping-mechanism to cause the release of the cardboard and that is automatically positioned to cause the release of the cardboard from the gripping-mechanism based at least in part on the length of the pre-treated cardboard, wherein the gripping-mechanism includes an actuating arm that comes into contact with the gradual arch cam shape and thus causes the gripping mechanism to open.

12. The automatic-adjustable stacker of claim 1, wherein the module preceding the automatic-adjustable stacker is a cardboard pre-treatmenter.

13. The automatic-adjustable stacker of claim 12, wherein the cardboard pre-treatmenter is a laser cardboard pre-treatmenter.

14. A method for controlling an automatic-adjustable stacker, the method being executed by a processor and controlling mechanical elements to perform the actions of:

getting information from a source identifying the length of a pretreated cardboard;

causing a first mechanism an automatic-adjustable stacker to grip a pre-treated cardboard at its leading edge from substantially an end edge of a module preceding the automatic-adjustable stacker;

transferring the pre-treated cardboard toward a pile of pre-treated cardboards; and releasing the pre-treated cardboard when the trailing edge of the pre-treated cardboard reaches substantially the end edge of the module preceding the automatic-adjustable stacker, and acting as a surface supporting the pre-treated cardboard, and wherein the first mechanism and the edge of the surface supporting the pre-treated cardboard cooperate to create a concavity-like shape to the pretreated cardboard while it is being transferred.

15. The method of claim 14, further comprises the action of automatically extending a length of an automatic-adjustable extender that is placed substantially near the end-edge of the module preceding the automatic-adjustable stacker based at least in part on commands gotten from a controller.

16. The method of claim 15, further comprising the action of sorting two or more piles of pre-treated cardboards by automatically adjusting the length of the automatic-adjustable extender according to commands gotten from the controller.

17. The method claim 14, further comprising the action of automatically positioning an automatic-adjustable limiter based at least in part on the length of the pre-treated cardboard, such that the automatic-adjustable limiter stops the inertia movement of the pre-treated cardboard when released from the automatic-adjustable gripper mechanism.

18. The method of claim 14, wherein the source for getting information identifying the length of the pretreated cardboard is obtained from one or more sensors.

19. The method of claim 14, wherein the source for getting information identifying the length of the pretreated cardboard is obtained from a job description.

20. The method of claim 14, further comprise automatically adjusting the length of a collector for receiving the cardboard.

21. The method of claim 20, wherein the action of automatically adjusting the length of the collector is based on the length of the pre-treated cardboard.

22. The method claim 14, further comprising the action of automatically adjusting the placement of a collector for receiving the cardboard.

23. The method claim 14, wherein the action of automatically adjusting the placement of the collector placement is based at least in part on the length of the pre-treated cardboard.

* * * * *